United States Patent
Gulsen

(10) Patent No.: US 9,504,122 B2
(45) Date of Patent: Nov. 22, 2016

(54) FLUORESCENT REPLACEMENT LED LAMPS

(71) Applicant: Microchip Technology Incorporated, Chandler, AZ (US)

(72) Inventor: John K. Gulsen, Aliso Viejo, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/063,436

(22) Filed: Mar. 7, 2016

(65) Prior Publication Data

US 2016/0270162 A1  Sep. 15, 2016

Related U.S. Application Data

(60) Provisional application No. 62/132,062, filed on Mar. 12, 2015.

(51) Int. Cl.
H05B 33/08 (2006.01)
F21K 99/00 (2016.01)
F21Y 101/02 (2006.01)

(52) U.S. Cl.
CPC ............ H05B 33/089 (2013.01); F21K 9/17 (2013.01); H05B 33/083 (2013.01); H05B 33/0812 (2013.01); H05B 33/0815 (2013.01); F21Y 2101/02 (2013.01)

(58) Field of Classification Search
CPC .. H05B 37/02; H05B 33/08; H05B 33/0803; H05B 33/0884; F21V 21/005; F21K 9/50; F21K 9/54; F21K 9/175

USPC ..... 315/185 R, 224–226, 291, 307, 308, 312
See application file for complete search history.

(56) References Cited

U.S. PATENT DOCUMENTS

2011/0260614 A1* 10/2011 Hartikka ................ F21K 9/00
                                                            315/51
2012/0062114 A1   3/2012 Chang ............................. 315/51

FOREIGN PATENT DOCUMENTS

| DE | 102013011822 A1 | 1/2015 | .............. F21V 19/04 |
| JP | 2004192833 A | 7/2004 | .............. H01L 33/50 |
| WO | 2010/069983 A1 | 6/2010 | .............. H05B 33/08 |

OTHER PUBLICATIONS

International Search Report and Written Opinion, Application No. PCT/US2016/021929, 15 pages, May 18, 2016.

* cited by examiner

*Primary Examiner* — Jimmy Vu
(74) *Attorney, Agent, or Firm* — Slayden Grubert Beard PLLC

(57) ABSTRACT

A light emitting diode (LED) lamp circuit is adapted to replace a fluorescent lamp in a fluorescent light fixture without having to modify the fluorescent light fixture in any way. The LED light string and its associated drive circuitry may be divided into two symmetric light strings. Furthermore, the two strings (power rails more precisely) may be tied together with a diode voltage/current steering system. The fluorescent replacement LED lamp design 'spoofs' all fluorescent lamp drive modes that a ballast could be configured for.

18 Claims, 29 Drawing Sheets

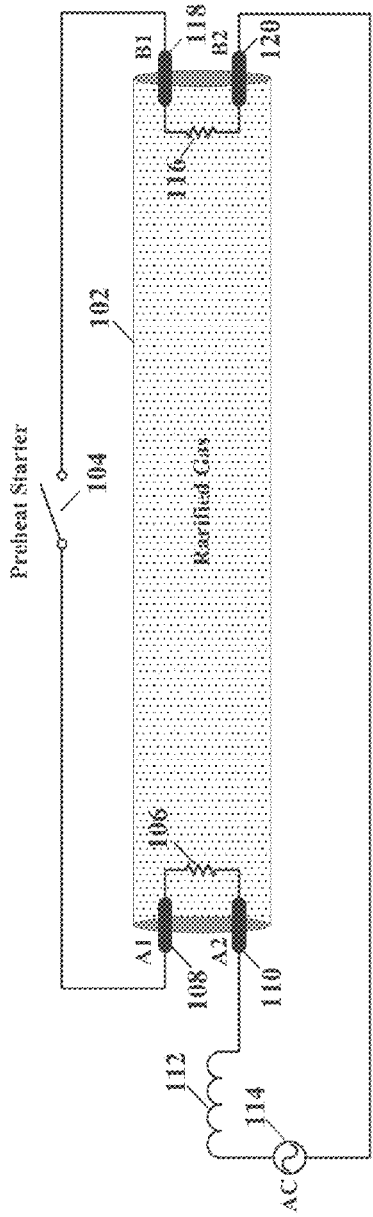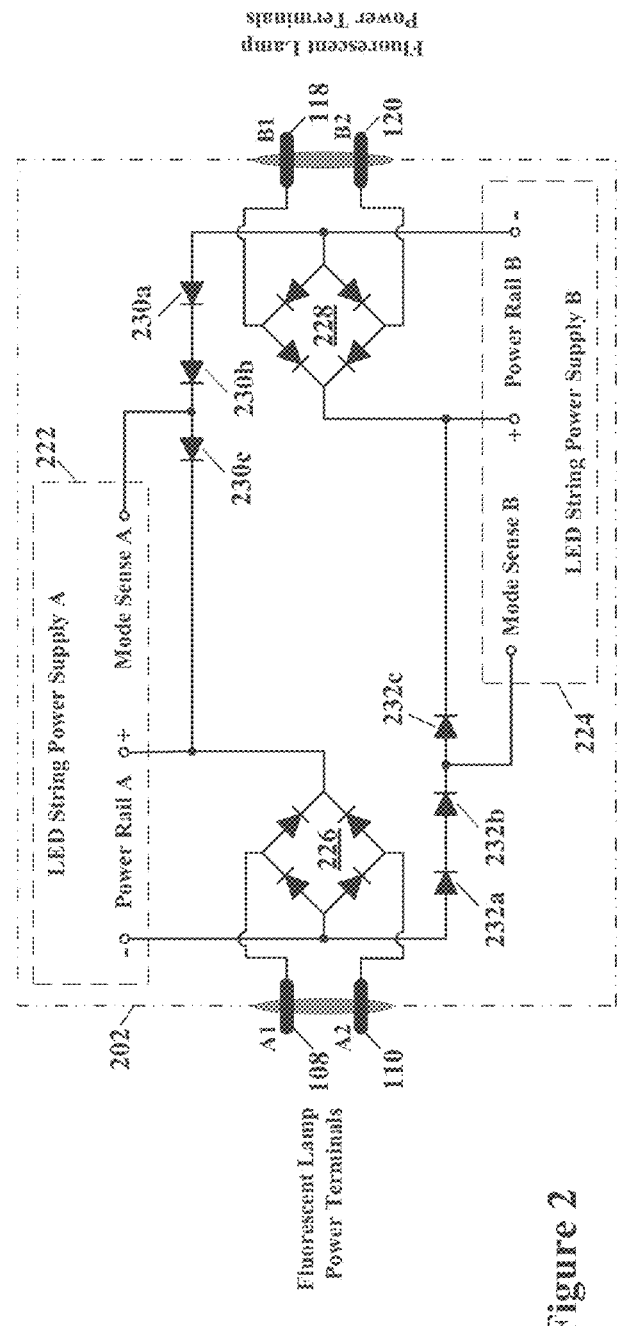
Figure 1 (Prior Art)
Figure 2

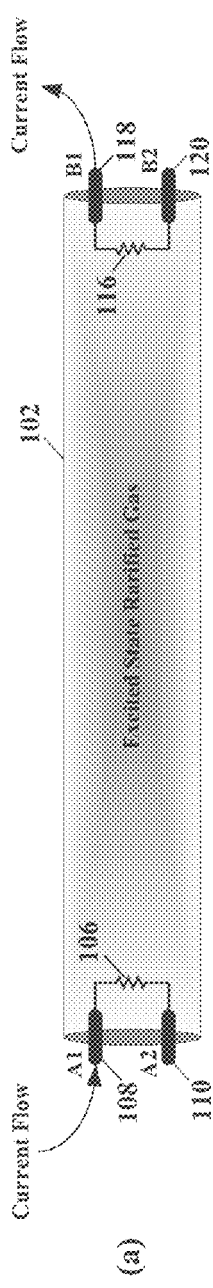
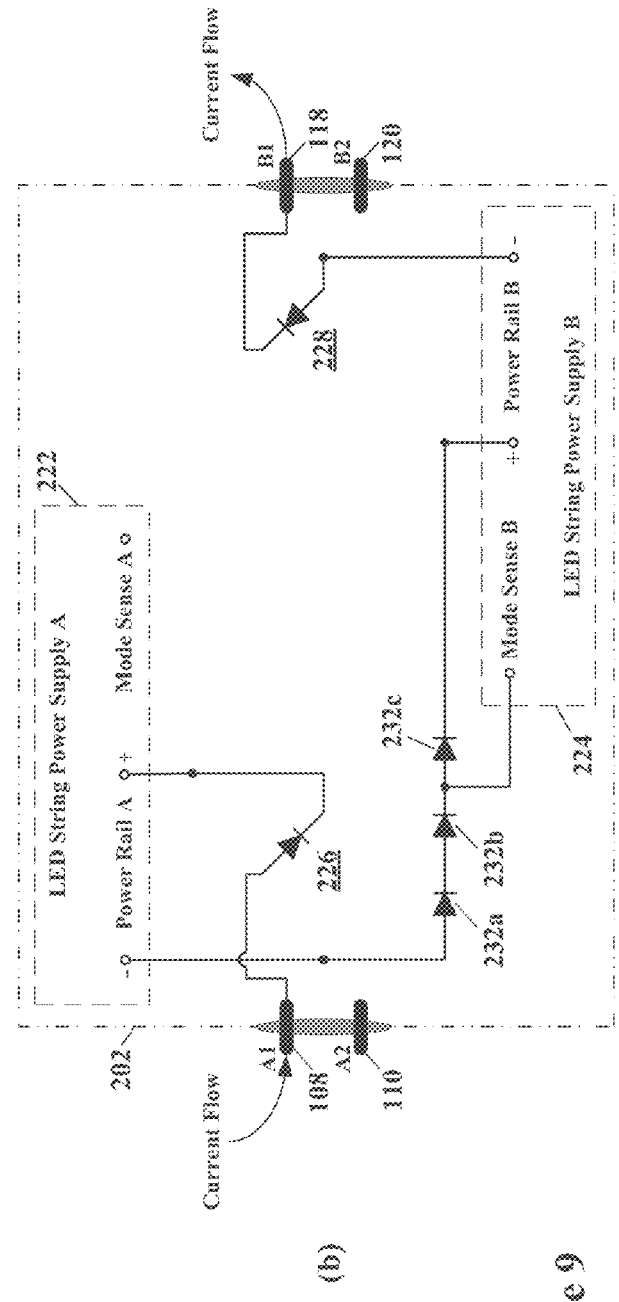
Figure 9

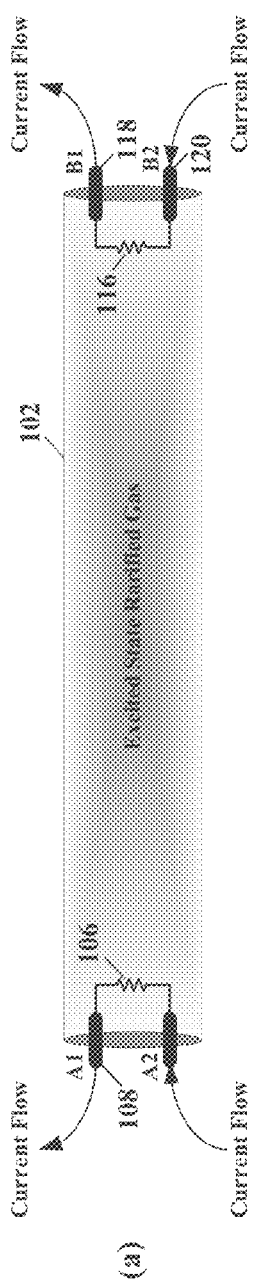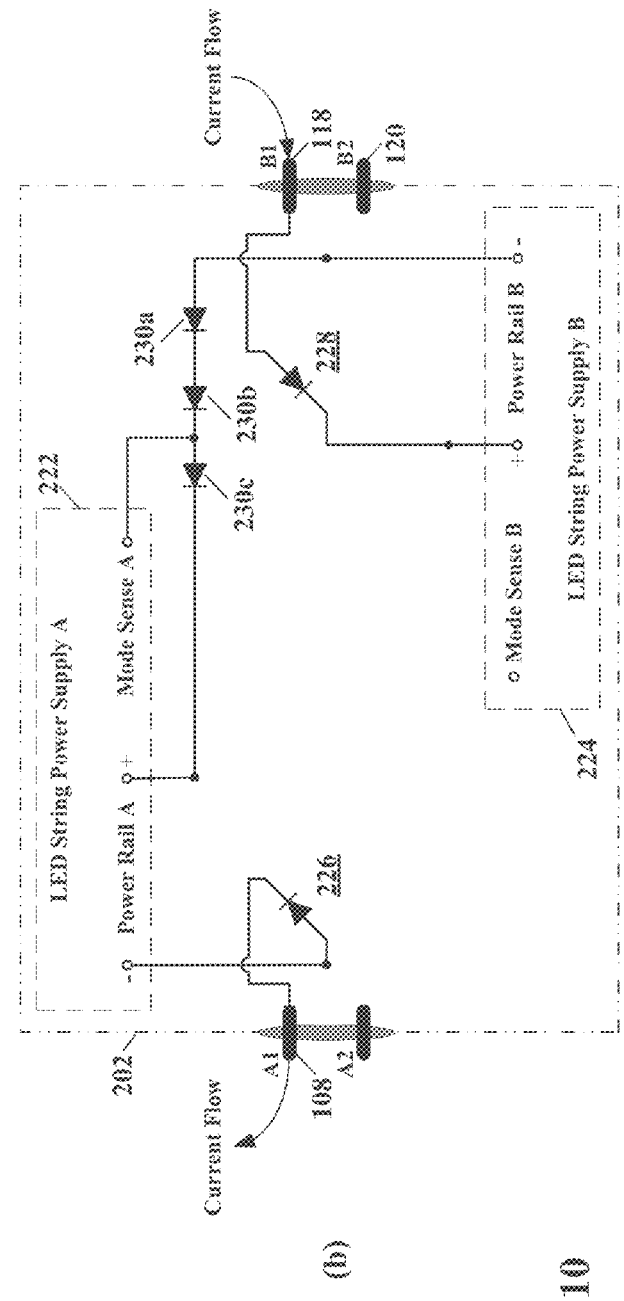
Figure 10

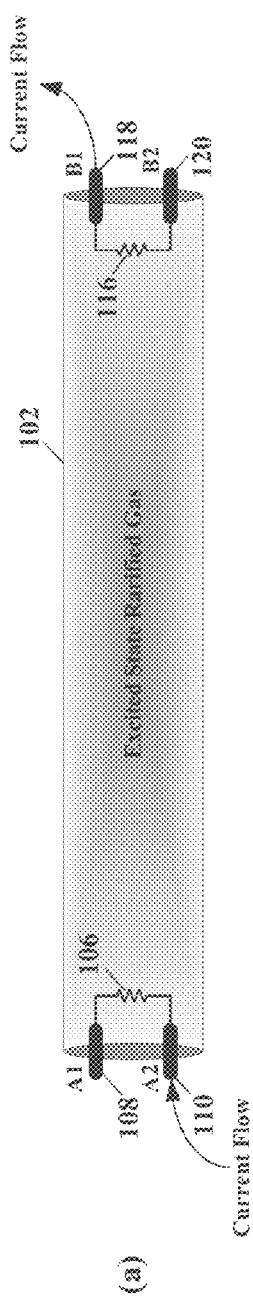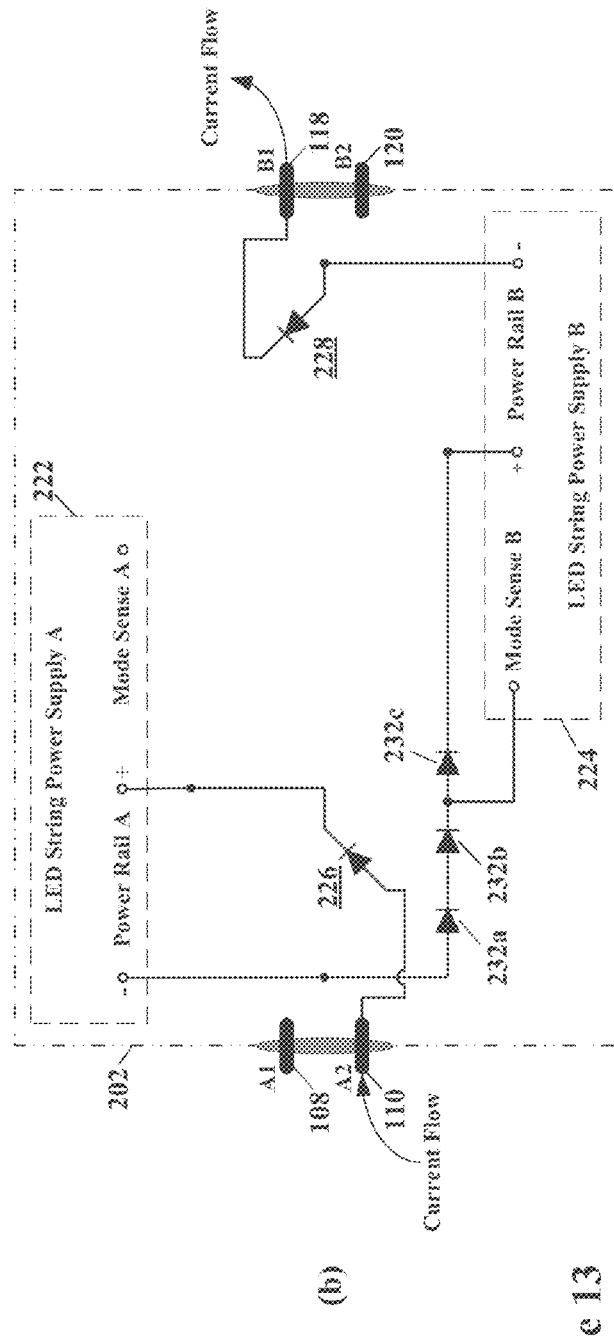
Figure 13

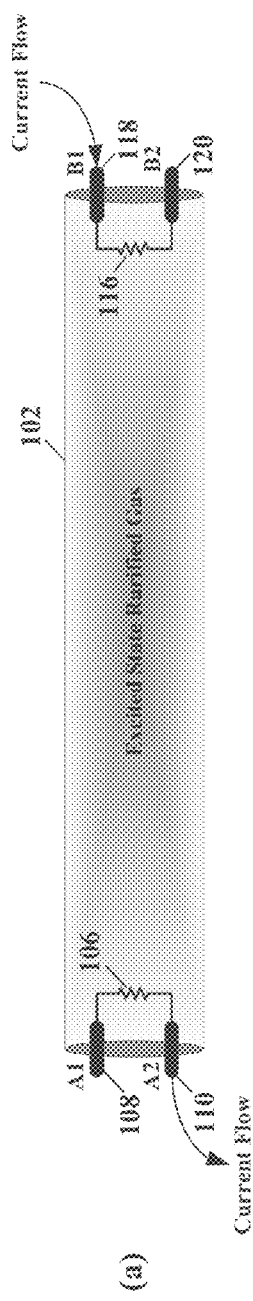
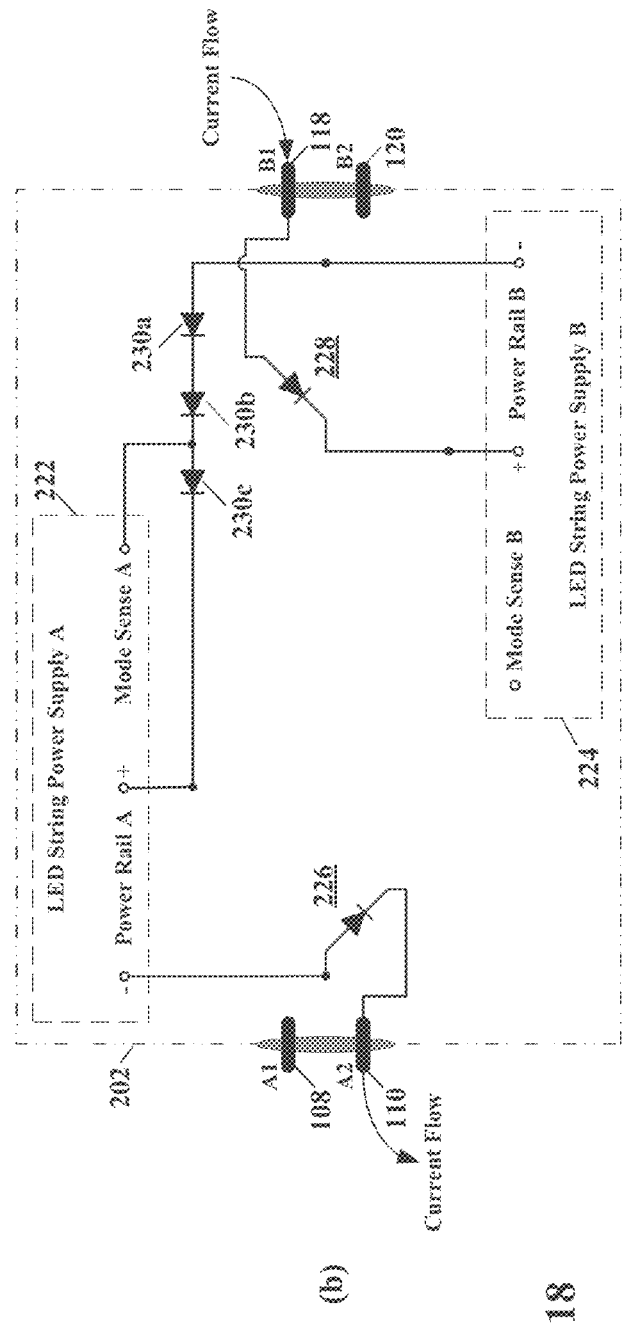
Figure 18

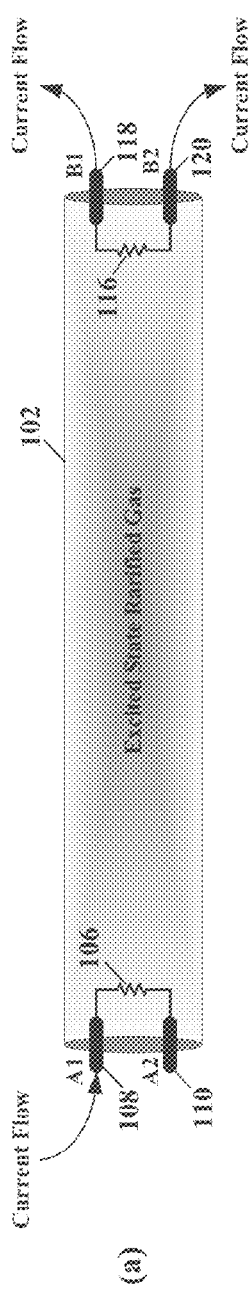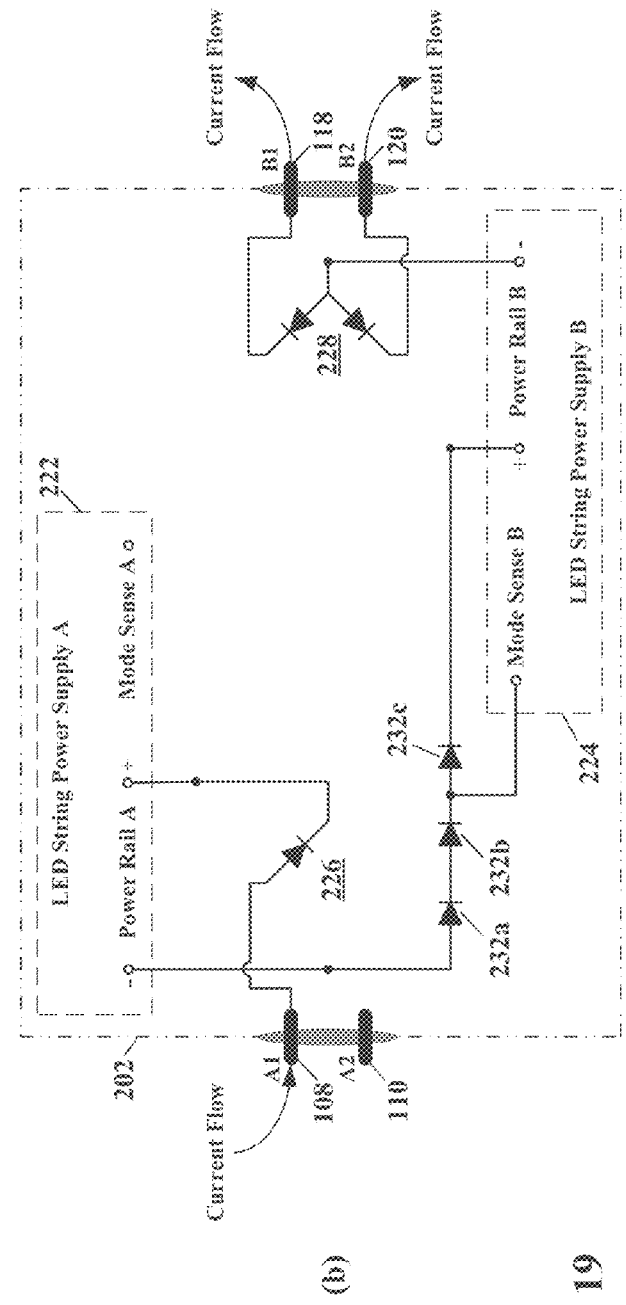
Figure 19

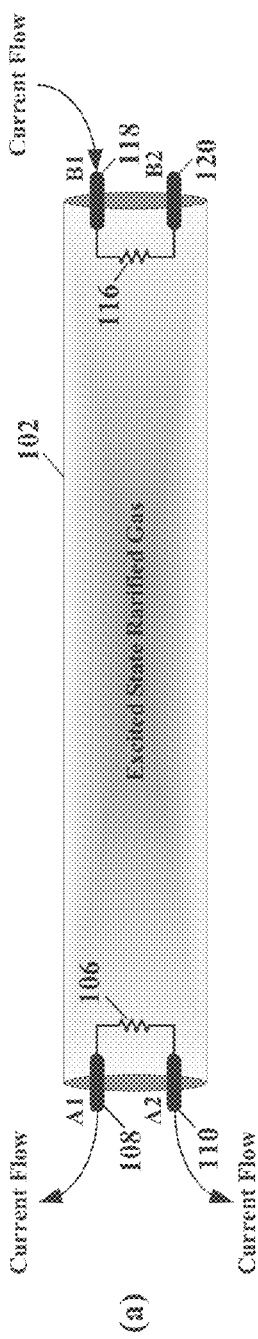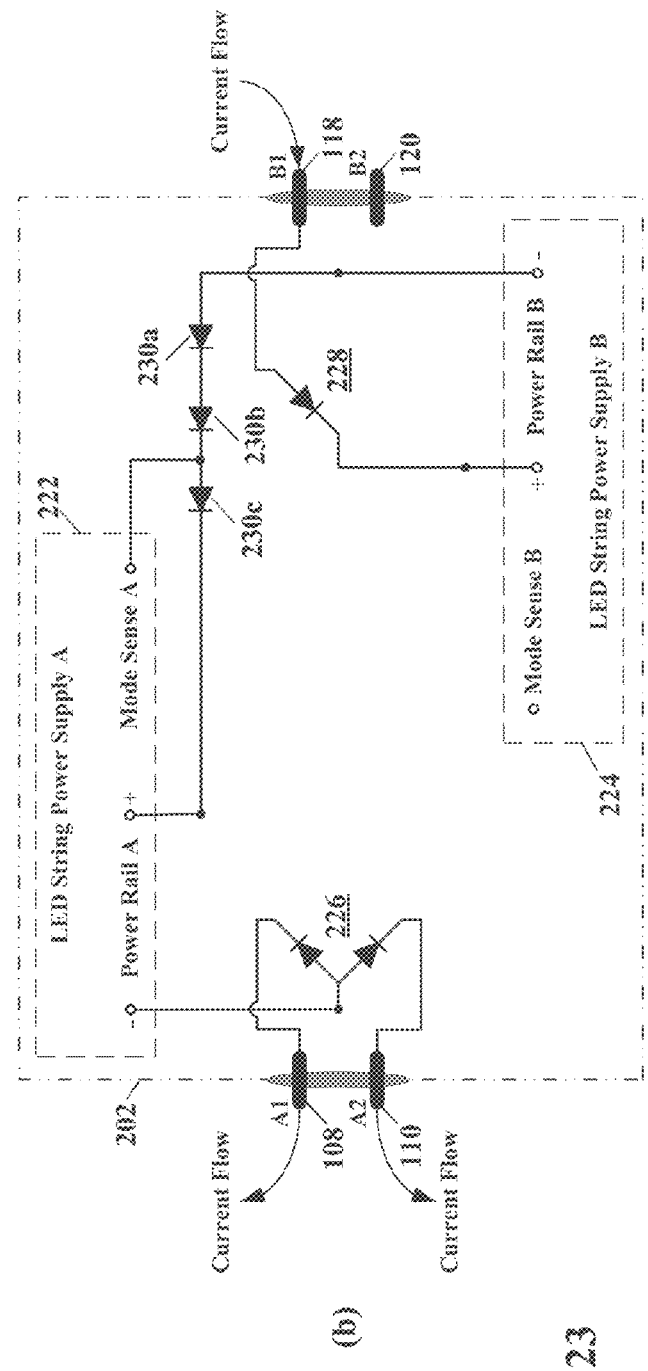
Running Conduction Mode Q
Figure 23

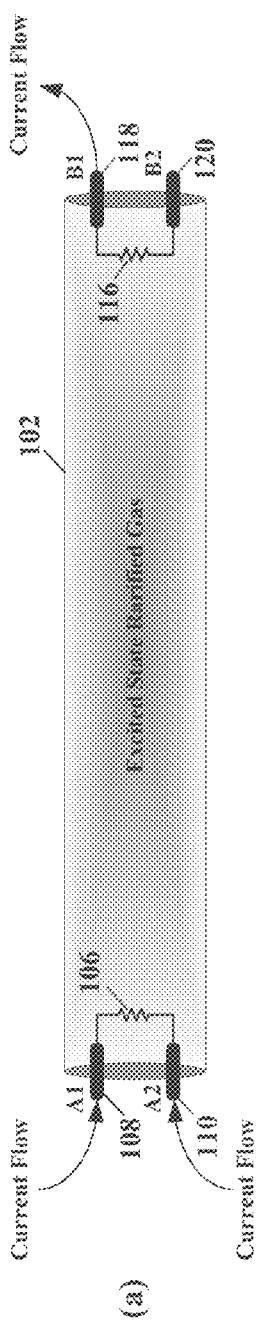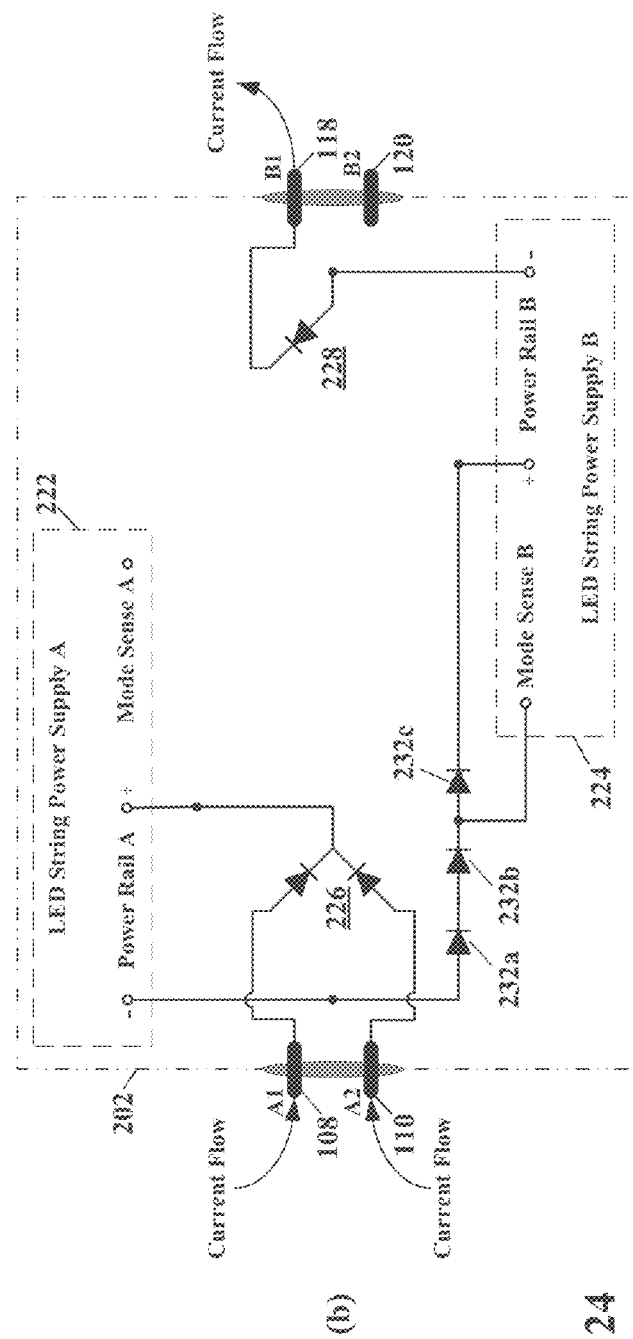
Figure 24

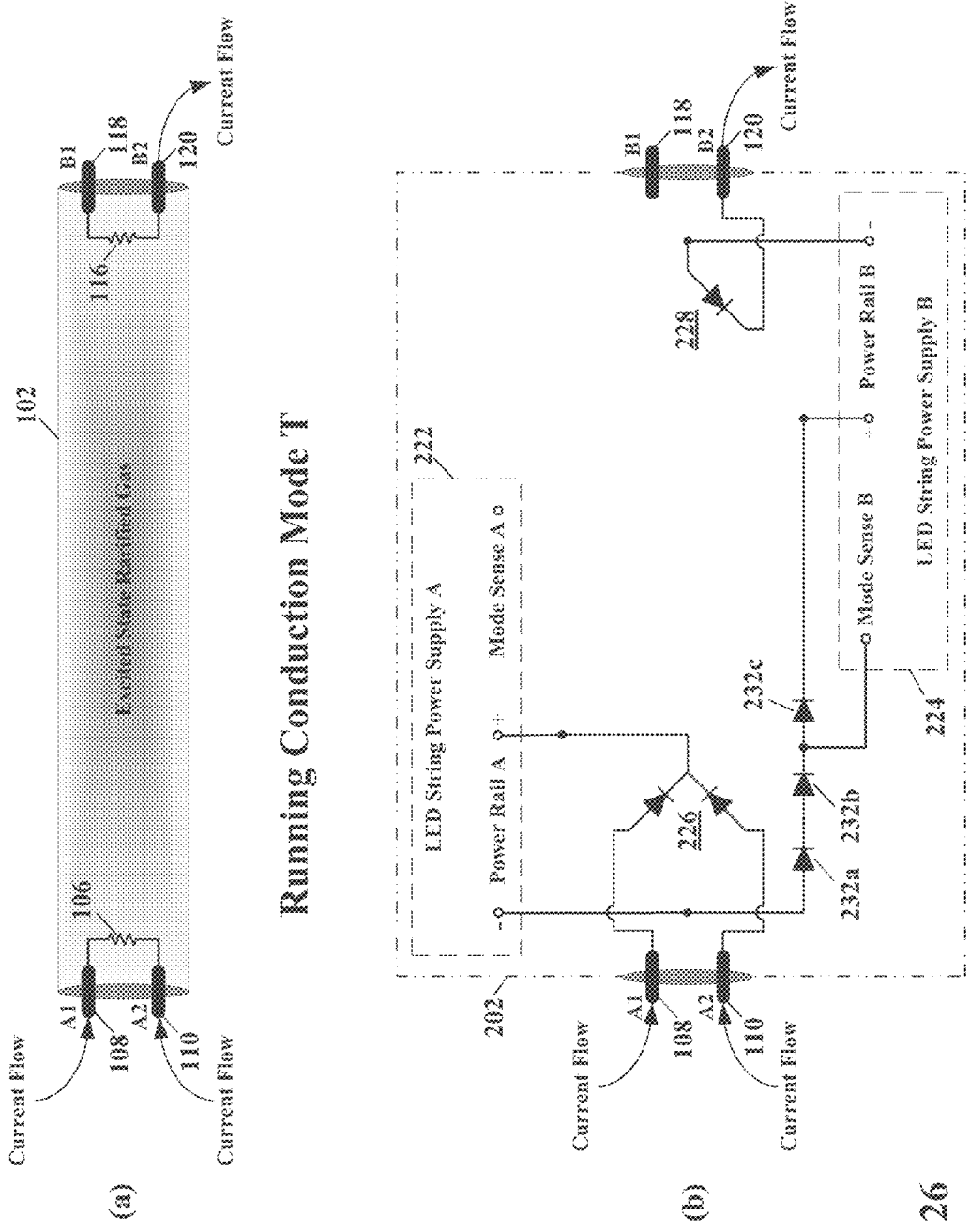

FLUORESCENT REPLACEMENT LED LAMPS

RELATED PATENT APPLICATION

This application claims priority to commonly owned U.S. Provisional Patent Application No. 62/132,062 filed Mar. 12, 2015; which is hereby incorporated by reference herein for all purposes.

TECHNICAL FIELD

The present disclosure relates to LED lamps, and, more particularly, to LED lamps designed to directly replace fluorescent lamps in existing fluorescent lamp fixtures without having to modify the lamp fixture wiring in anyway.

BACKGROUND

As the price of light emitting diode (LED) lamps decrease they become more attractive of use in lighting, with further advantages over prior technology incandescent and fluorescent lamps of longer useful life and lower power consumption. Many millions of commercial and industrial lighting fixtures use fluorescent lamps that would greatly benefit by using LED lamps to replace these fluorescent lamps. However, the vast majority of these fluorescent lighting fixtures require a modification to made thereto when LED lamps are installed therein, e.g., bypass the lighting ballast. Some newer LED lamps have been designed to replace fluorescent lamps with certain types of ballasts without having to rewire the fixture, but not all ballasts, generally only instant start ballasts. Removal and/or rewiring of a fluorescent lamp ballast is not difficult but is a hazardous activity since high voltage may be present. This removal work typically requires a qualified electrician.

An example of a simplified fluorescent lighting fixture circuit is shown in FIG. 1. The fluorescent lamp circuit operation can be understood as two states of operation: 1) Lamp Preheat/Start and 2) Lamp Running. The purpose of the Preheat State on the fluorescent lamp 102 is to ionize the rarefied gas present in the lamp 102. There are typically two filaments 106 and 116, one at each end of the fluorescent lamp 102 (a glass tube with a phosphorescent coating on the inside surface of the glass tube. When the preheat starter switch 104 is closed, Current from an AC source 114 flows through the filaments 106 and 116. The application of current through the filaments 106 and 116 heats them, and so, ionizes the gas surrounding them. Also, because there is an inductor 112 in series with the filaments 106 and 116, the AC current flows through the inductor 112 as well. This inductor 112 is typically called a ballast in this art. When the preheat starter switch 104 is opened, current across the filaments 106 and 116 will cease. But by Faraday's Law of Magnetic Induction, any current that was flowing through the inductor 112 (ballast) cannot instantaneously cease. The collapsing magnetic field in the inductor 112 will cause current to still flow. The voltage across the inductor 112 will rise in order to accommodate this law of physics. Since the gas in the lamp has been partially ionized during the Preheat State, it is conductive. The rising voltage from the inductor 112 will start the current flow across the ionized gas in the lamp 102, from end to end. This event is called "Striking the Lamp" in this art. Basically an arc through the ionized gas is created to allow the inductor 112 to continue its current flow. Once current flows across the entire lamp 102, the gas becomes fully ionized, and AC current flows continuously across it. In this "Running State," the inductor 112 is used for its other purpose, to limit the lamp current.

The previous description was for a magnetic ballast used in fluorescent lamp circuits. There are a number of other more complex fluorescent ballast designs in the art. The many innovations already developed for this technology and currently available in the lighting market allow for smaller ballast designs, better energy efficiency, higher lamp start reliability (including re-starting the lamp if it went out), lamp dim-ability, lamp flicker avoidance, ballast buzz noise avoidance, and many safety related features involving damaged or 'burnt-out' lamps. But they all have one thing in common: There is always a 'black box' in the fluorescent lamp fixture called a "ballast." This ballast device starts the lamp and drives the lamp with a limited current while it is on.

The LED replacement lamps available today require a modification to the wiring in the fluorescent lamp fixture. The single reason for this is that the current state of the art in LED replacement lamp technology does not emulate the behavior of fluorescent bulbs adequately enough for the ballasts to drive them correctly. Many LED replacement lamp vendors have disclaimers on their products that have statements like this:

1) Clip and tie off <a particular> ballast wire in the fixture to allow this replacement lamp to work correctly in your existing fluorescent lamp fixture.
2) The ballast must be removed and the fixture rewired for proper operation.
3) This lamp works with Instant Start Ballasts only. Removal of the existing ballast and rewiring of the fixture is required if not using an Instant Start Ballast.

There are also warnings on many LED replacement lamp products that state that any rewiring of the fixtures should be performed only by a qualified service technician. These restrictions on the usability of these replacement lamps inhibit their wide market acceptance. This market is in need of a technology that allows an LED replacement lamp to be manufactured so that ballasts designed for standard hot cathode fluorescent lamps operate correctly with the LED lamp replacement.

SUMMARY

Hence there is a need for LED lamps that can replace standard hot cathode fluorescent lamps as used in existing fluorescent light fixtures without having to modify the wiring of these fixtures.

According to an embodiment, a light emitting diode (LED) apparatus for replacing a fluorescent lamp may comprise: a LED lamp structure having first, second, third and fourth electrical contacts configured to match size and locations of respective electrical contacts of a fluorescent lamp; a first LED light string and first power supply located in the LED lamp structure, the first power supply having plus and minus power inputs; a second LED light string and second power supply located in the LED lamp structure, the second power supply having plus and minus power inputs; a first plurality of diodes arranged in a bridge rectifier configuration and having first, second, third and fourth nodes, wherein the first node may be coupled to the minus power input of the first power supply, the second node may be coupled to the first electrical contact, the third node may be coupled to the plus power input of the first power supply, and the fourth node may be coupled to the second electrical contact; a second plurality of diodes arranged in a bridge rectifier configuration and having first, second, third and fourth nodes, wherein the first node may be coupled to the minus power input of the second power supply, the second node may be coupled to the third electrical contact, the third node may be coupled to the plus power input of the second power supply, and the fourth node may be coupled to the fourth electrical contact; a third plurality of diodes arranged in a series coupled string, wherein an anode of the series coupled string of the third plurality of diodes may be coupled to the minus power input of the first power supply and the first node of the first plurality of diodes, and a cathode of the series coupled string of the third plurality of diodes may be coupled to the plus power input of the second power supply and the third node of the second plurality of diodes; and a fourth plurality of diodes arranged in a series coupled string, wherein an anode of the series coupled string of the fourth plurality of diodes may be coupled to the minus power input of the second power supply and the first node of the second plurality of diodes, and a cathode of the series coupled string of the fourth plurality of diodes may be coupled to the plus power input of the first power supply and the third node of the first plurality of diodes.

According to a further embodiment, a first mode sense input may be associated with the first power supply and may be coupled to an anode of the diode having its cathode coupled to the plus power input of the first power supply; and a second mode sense input may be associated with the second power supply and may be coupled to an anode of the diode having its cathode coupled to the plus power input of the second power supply. According to a further embodiment, each of the first and second LED light strings may comprise a plurality of LEDs. According to a further embodiment, the first and second power supplies may each comprise a constant current source. According to a further embodiment, the first and second power supplies may each comprise a sequential linear LED driver. According to a further embodiment, the first and second power supplies may each comprise a buck switched mode power supply.

According to a further embodiment, a first microcontroller may have an input coupled to the first mode sense input of the first power supply; a first LED driver may be controlled by the first microcontroller; a second microcontroller may have an input coupled to the second mode sense input of the second power supply; and a second LED driver may be controlled by the second microcontroller; wherein the first and second LED drivers may adjust current through the first and second LED light strings, respectively, based upon signal voltages at the first and second mode sense inputs. According to a further embodiment, the LED lamp structure may be selected from the group consisting of bi-pin T-5, T-8, T-10, T-12, and T-17 equivalent lamp sizes. According to a further embodiment, the LED lamp structure may be selected from the group consisting of two, four, and eight foot lengths. According to a further embodiment, the LED lamp structure may comprise a bi-pin U-bend tube. According to a further embodiment, the first, second, third and fourth plurality of diodes may be selected from the group consisting of silicon, Schottky and fast recovery diodes.

According to another embodiment, a light emitting diode (LED) apparatus for replacing a fluorescent lamp may comprise: a LED lamp structure having first, second, third and fourth electrical contacts configured to match size and locations of respective electrical contacts of a fluorescent lamp; a first LED light string and first power supply located in the LED lamp structure, the first power supply having plus and minus power inputs; a second LED light string and second power supply located in the LED lamp structure, the second power supply having plus and minus power inputs; a first plurality of metal oxide field effect transistors (MOSFETs) arranged in a bridge rectifier configuration and having first, second, third and fourth nodes, wherein the first node may be coupled to the minus power input of the first power supply, the second node may be coupled to the first electrical contact, the third node may be coupled to the plus power input of the first power supply, and the fourth node may be coupled to the second electrical contact; a second plurality of MOSFETs arranged in a bridge rectifier configuration and having first, second, third and fourth nodes, wherein the first node may be coupled to the minus power input of the second power supply, the second node may be coupled to the third electrical contact, the third node may be coupled to the plus power input of the second power supply, and the fourth node may be coupled to the fourth electrical contact; a first diode, wherein an anode of the first of diode may be coupled to the minus power input of the first power supply and the first node of the first plurality of MOSFETs, and a cathode of the first diode may be coupled to the plus power input of the second power supply and the third node of the second plurality of MOSFETs; and a second diode, wherein an anode of the second diode may be coupled to the minus power input of the second power supply and the first node of the second plurality of MOSFETs, and a cathode of the second diode may be coupled to the plus power input of the first power supply and the third node of the first plurality of MOSFETs.

According to a further embodiment, a first mode sense input may be associated with the first power supply and may be coupled to the anode of the second diode having its cathode coupled to the plus power input of the first power supply; and a second mode sense input may be associated with the second power supply and may be coupled to an anode of the first diode having its cathode coupled to the plus power input of the second power supply. According to a further embodiment, a first microcontroller may have an input coupled to the first mode sense input of the first power supply; a first LED driver may be controlled by the first microcontroller; a second microcontroller having an input coupled to the second mode sense input of the second power supply; and a second LED driver may be controlled by the second microcontroller; wherein the first and second LED drivers may adjust current through the first and second LED light strings, respectively, based upon signal voltages at the first and second mode sense inputs. According to a further embodiment, the first and second power supplies may each comprise a sequential linear LED driver.

According to yet another embodiment, a method for replacing a fluorescent lamp with a light emitting diode (LED) lamp may comprise the steps of: providing a LED lamp structure having first, second, third and fourth electrical contacts configured to match size and locations of respective electrical contacts of a fluorescent lamp; providing a first LED light string and first power supply located in the LED lamp structure, the first power supply having plus and minus power inputs; providing a second LED light string and second power supply located in the LED lamp structure, the second power supply having plus and minus power inputs; providing a first plurality of diodes arranged in a bridge rectifier configuration and having first, second, third and fourth nodes, wherein the first node may be coupled to the minus power input of the first power supply, the second node may be coupled to the first electrical contact, the third node may be coupled to the plus power input of the first power supply, and the fourth node may be coupled to the second electrical contact; providing a second plurality of diodes arranged in a bridge rectifier configuration and having first, second, third and fourth nodes, wherein the first node may be coupled to the minus power input of the second power supply, the second node may be coupled to the third electrical contact, the third node may be coupled to the plus power input of the second power supply, and the fourth node may be coupled to the fourth electrical contact; providing a third plurality of diodes arranged in a series coupled string, wherein an anode of the series coupled string of the third plurality of diodes may be coupled to the minus power input of the first power supply and the first node of the first plurality of diodes, and a cathode of the series coupled string of the third plurality of diodes may be coupled to the plus power input of the second power supply and the third node of the second plurality of diodes; and providing a fourth plurality of diodes arranged in a series coupled string, wherein an anode of the series coupled string of the fourth plurality of diodes may be coupled to the minus power input of the second power supply and the first node of the second plurality of diodes, and a cathode of the series coupled string of the fourth plurality of diodes may be coupled to the plus power input of the first power supply and the third node of the first plurality of diodes. According to a further embodiment of the method, may comprise the step of installing the LED lamp structure into a fluorescent lamp fixture.

According to still another embodiment, a method for replacing a fluorescent lamp with a light emitting diode (LED) lamp may comprise the steps of: providing a LED lamp structure having first, second, third and fourth electrical contacts configured to match size and locations of respective electrical contacts of a fluorescent lamp; providing a first LED light string and first power supply located in the LED lamp structure, the first power supply having plus and minus power inputs; providing a second LED light string and second power supply located in the LED lamp structure, the second power supply having plus and minus power inputs; providing a first plurality of metal oxide field effect transistors (MOSFETs) arranged in a bridge rectifier configuration and having first, second, third and fourth nodes, wherein the first node may be coupled to the minus power input of the first power supply, the second node may be coupled to the first electrical contact, the third node may be coupled to the plus power input of the first power supply, and the fourth node may be coupled to the second electrical contact; providing a second plurality of MOSFETs arranged in a bridge rectifier configuration and having first, second, third and fourth nodes, wherein the first node may be coupled to the minus power input of the second power supply, the second node may be coupled to the third electrical contact, the third node may be coupled to the plus power input of the second power supply, and the fourth node may be coupled to the fourth electrical contact; providing a first diode, wherein an anode of the first diode may be coupled to the minus power input of the first power supply and the first node of the first plurality of MOSFETs, and a cathode of the first diode may be coupled to the plus power input of the second power supply and the third node of the second plurality of MOSFETs; and providing a second diode, wherein an anode of the second diode may be coupled to the minus power input of the second power supply and the first node of the second plurality of MOSFETs, and a cathode of the second diode may be coupled to the plus power input of the first power supply and the third node of the first plurality of MOSFETs.

BRIEF DESCRIPTION OF THE DRAWINGS

A more complete understanding of the present disclosure may be acquired by referring to the following description taken in conjunction with the accompanying drawings wherein:

FIG. 1 illustrates a schematic diagram of a prior art fluorescent lamp and ballast;

FIG. 2 illustrates a schematic diagram of a LED lamp circuit adapted for replacing a fluorescent lamp in a fluorescent fixture without having to modify the fluorescent fixture, according to specific example embodiments of this disclosure;

FIG. 9 illustrates schematic diagrams of a fluorescent lamp in a running conduction mode C and operation of the LED lamp circuit shown in FIG. 2 that "mimics" this fluorescent lamp operation, according to the teachings of this disclosure;

FIG. 10 illustrates schematic diagrams of a fluorescent lamp in a running conduction mode D and operation of the LED lamp circuit shown in FIG. 2 that "mimics" this fluorescent lamp operation, according to the teachings of this disclosure;

FIG. 13 illustrates schematic diagrams of a fluorescent lamp in a running conduction mode G and operation of the LED lamp circuit shown in FIG. 2 that "mimics" this fluorescent lamp operation, according to the teachings of this disclosure;

FIG. 18 illustrates schematic diagrams of a fluorescent lamp in a running conduction mode L and operation of the LED lamp circuit shown in FIG. 2 that "mimics" this fluorescent lamp operation, according to the teachings of this disclosure;

FIG. 19 illustrates schematic diagrams of a fluorescent lamp in a running conduction mode M and operation of the LED lamp circuit shown in FIG. 2 that "mimics" this fluorescent lamp operation, according to the teachings of this disclosure;

FIG. 23 illustrates schematic diagrams of a fluorescent lamp in a running conduction mode Q and operation of the LED lamp circuit shown in FIG. 2 that "mimics" this fluorescent lamp operation, according to the teachings of this disclosure;

FIG. 24 illustrates schematic diagrams of a fluorescent lamp in a running conduction mode R and operation of the LED lamp circuit shown in FIG. 2 that "mimics" this fluorescent lamp operation, according to the teachings of this disclosure;

FIG. 26 illustrates schematic diagrams of a fluorescent lamp in a running conduction mode T and operation of the LED lamp circuit shown in FIG. 2 that "mimics" this fluorescent lamp operation, according to the teachings of this disclosure;

Figure 3:
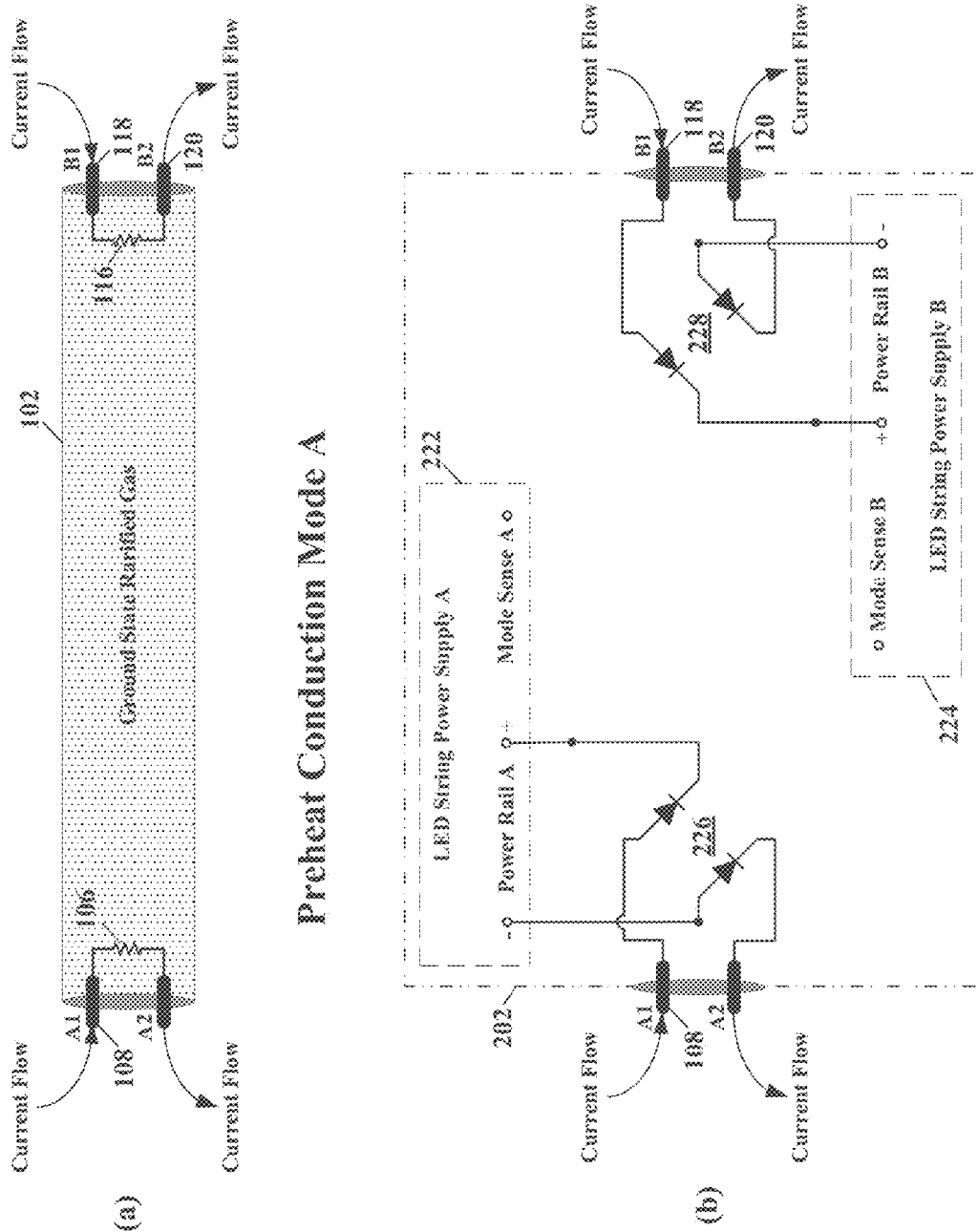
FIG. 3 illustrates schematic diagrams of a fluorescent lamp in a preheat conduction mode A and operation of the LED lamp circuit shown in FIG. 2 that "mimics" this fluorescent lamp operation, according to the teachings of this disclosure.
Figure 4:
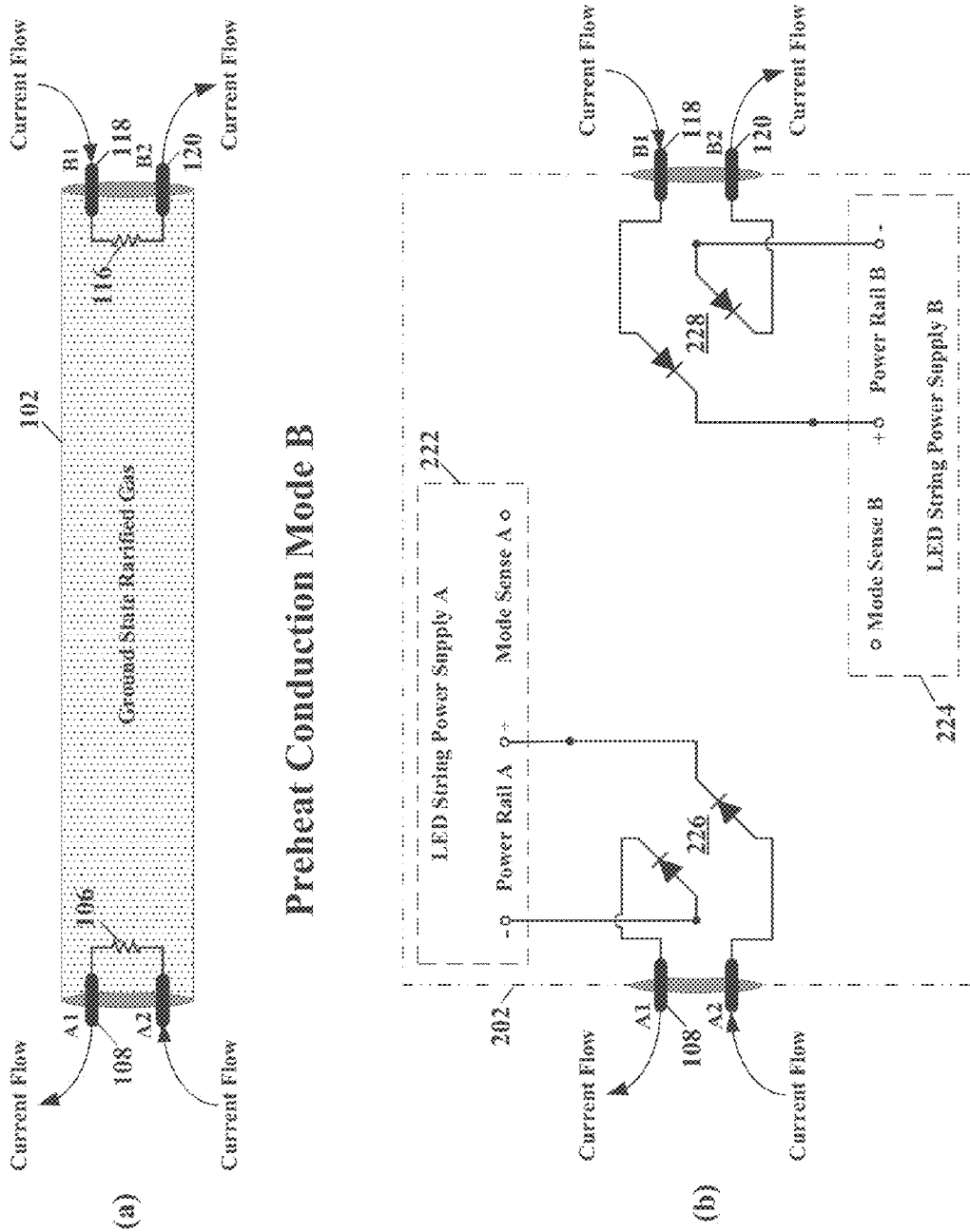
FIG. 4 illustrates schematic diagrams of a fluorescent lamp in a preheat conduction mode B and operation of the LED lamp circuit shown in FIG. 2 that "mimics" this fluorescent lamp operation, according to the teachings of this disclosure.
Figure 5:
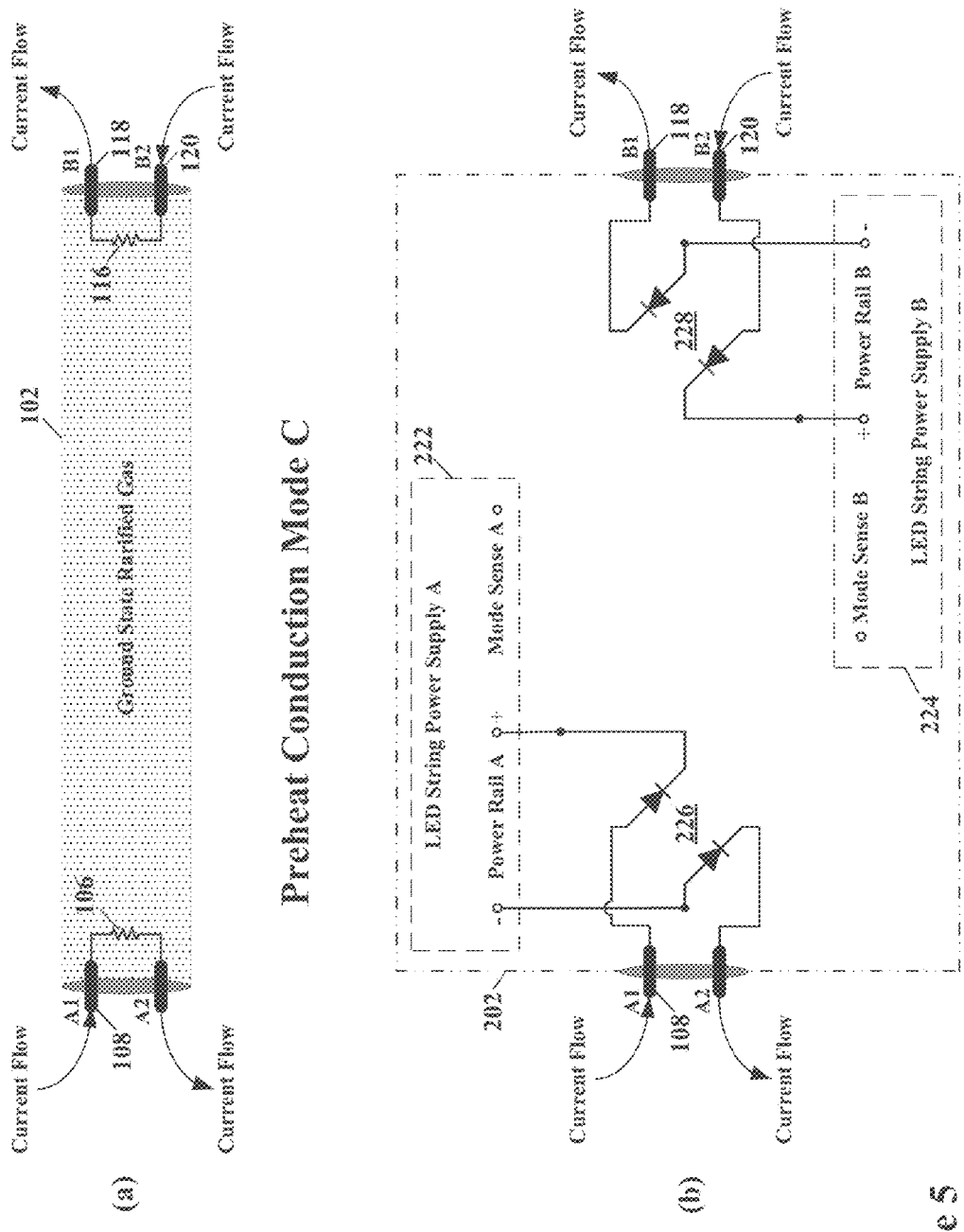
FIG. 5 illustrates schematic diagrams of a fluorescent lamp in a preheat conduction mode C and operation of the LED lamp circuit shown in FIG. 2 that "mimics" this fluorescent lamp operation, according to the teachings of this disclosure.
Figure 6:
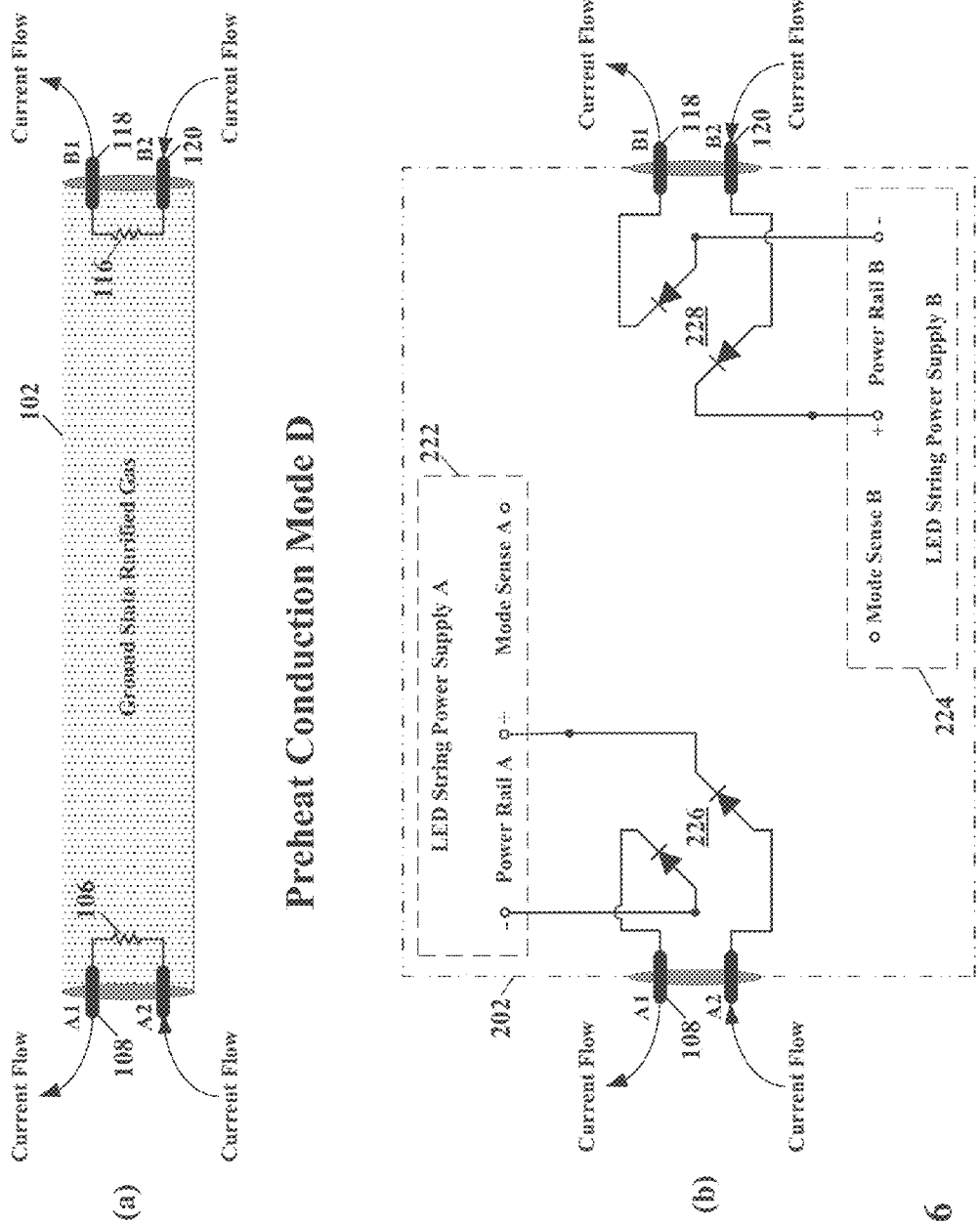
FIG. 6 illustrates schematic diagrams of a fluorescent lamp in a preheat conduction mode D and operation of the LED lamp circuit shown in FIG. 2 that "mimics" this fluorescent lamp operation, according to the teachings of this disclosure.
Figure 7:
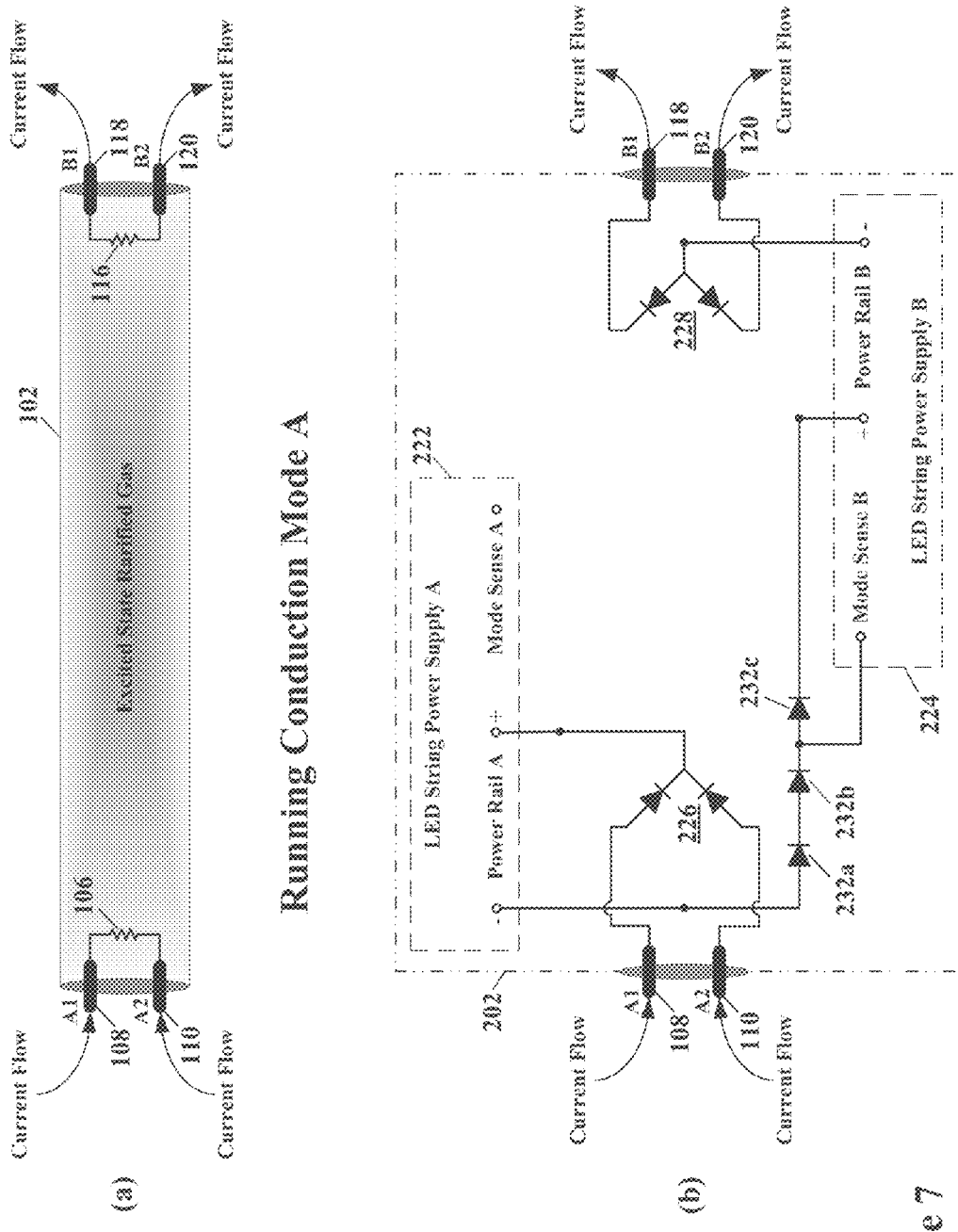
FIG. 7 illustrates schematic diagrams of a fluorescent lamp in a running conduction mode A and operation of the LED lamp circuit shown in FIG. 2 that "mimics" this fluorescent lamp operation, according to the teachings of this disclosure.
Figure 8:
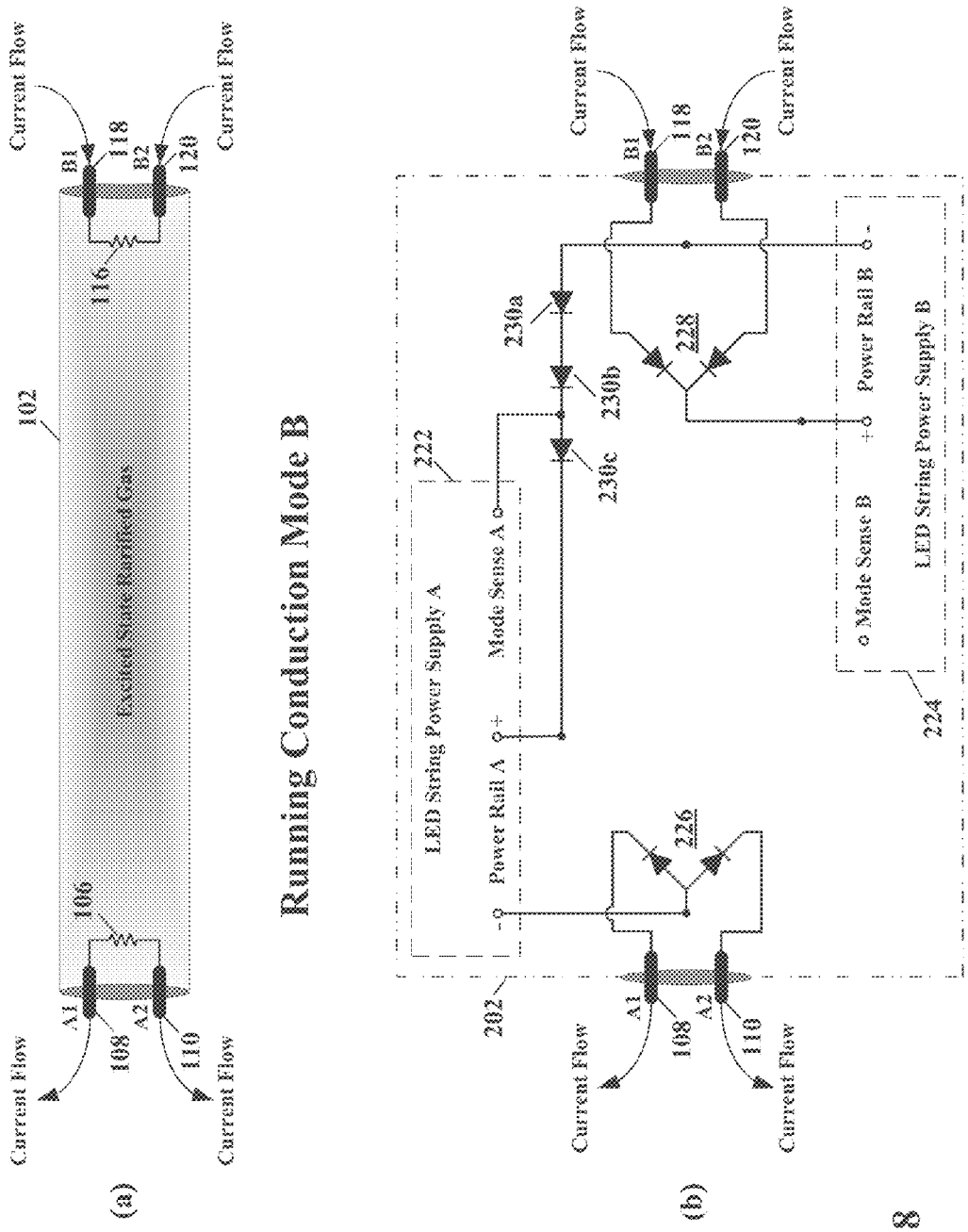
FIG. 8 illustrates schematic diagrams of a fluorescent lamp in a running conduction mode B and operation of the LED lamp circuit shown in FIG. 2 that "mimics" this fluorescent lamp operation, according to the teachings of this disclosure.
Figure 11:
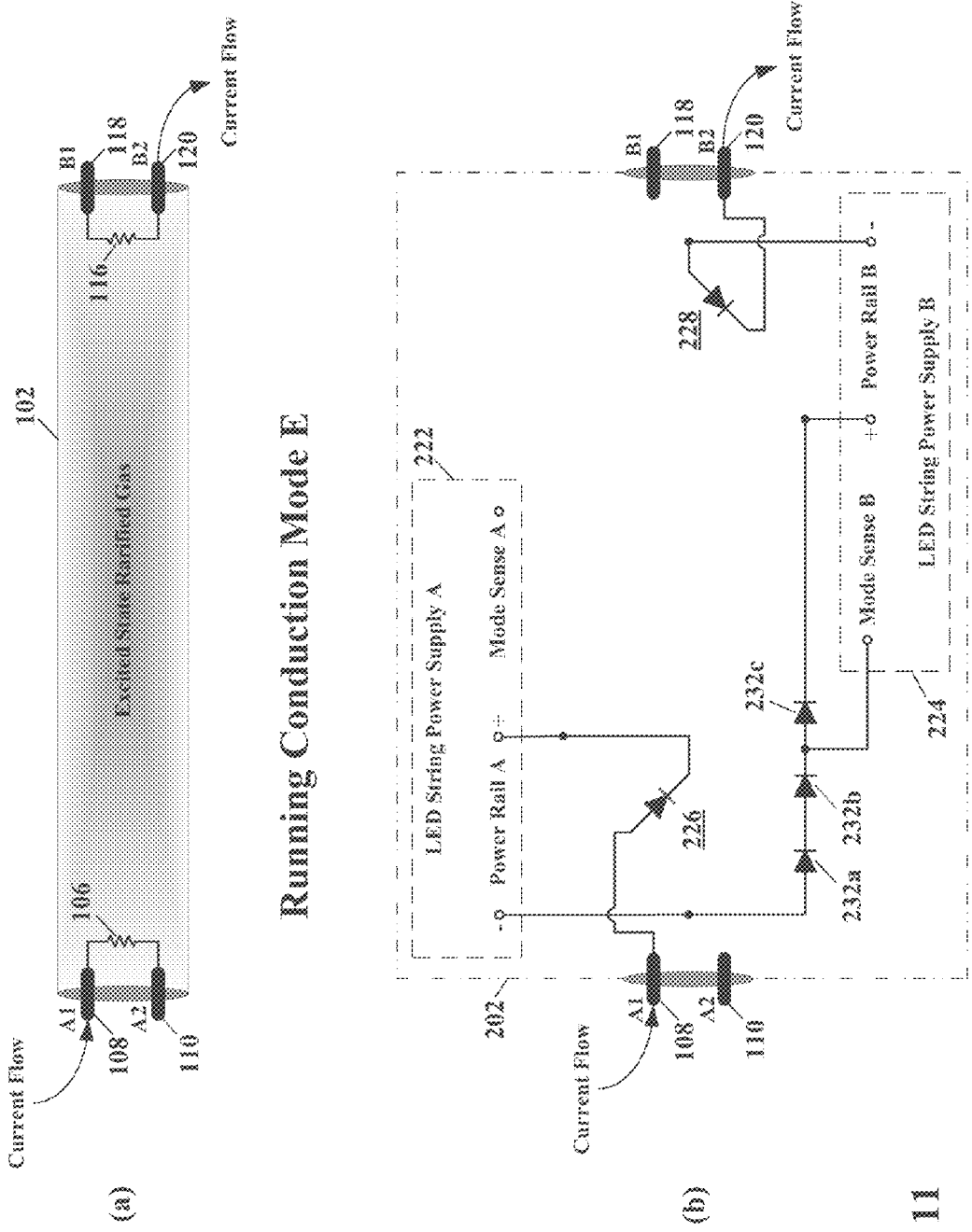
FIG. 11 illustrates schematic diagrams of a fluorescent lamp in a running conduction mode E and operation of the LED lamp circuit shown in FIG. 2 that "mimics" this fluorescent lamp operation, according to the teachings of this disclosure.
Figure 12:
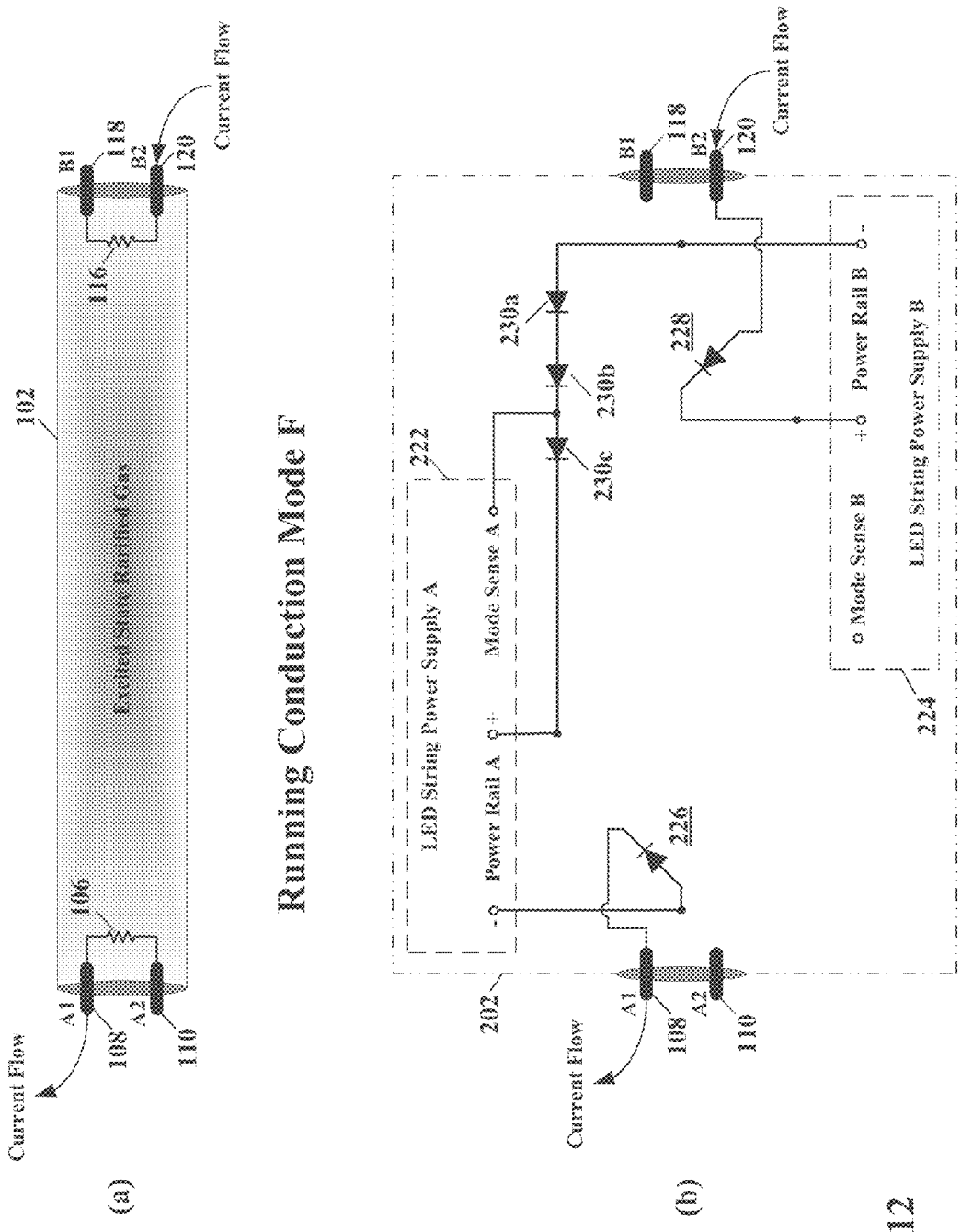
FIG. 12 illustrates schematic diagrams of a fluorescent lamp in a running conduction mode F and operation of the LED lamp circuit shown in FIG. 2 that "mimics" this fluorescent lamp operation, according to the teachings of this disclosure.
Figure 14:
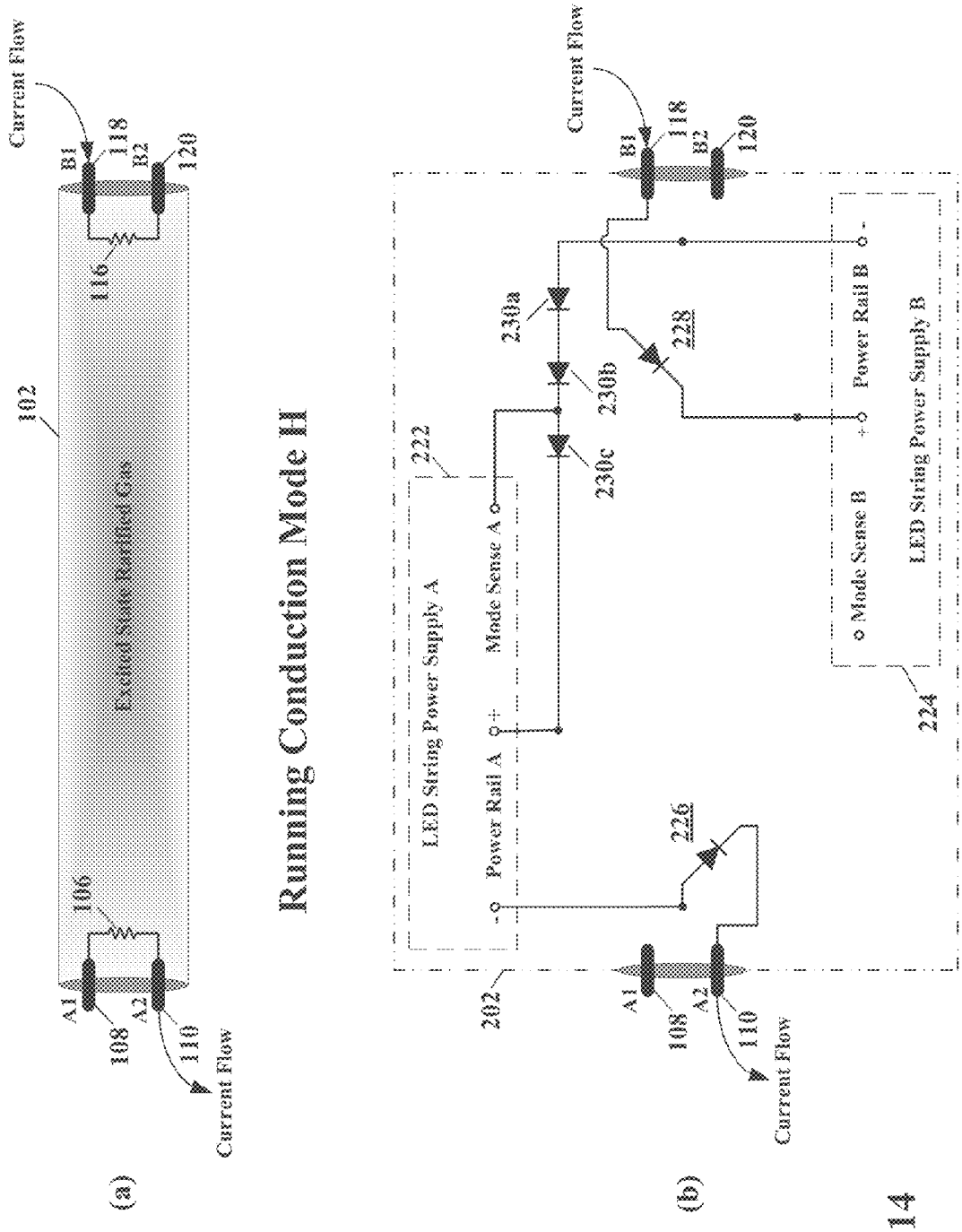
FIG. 14 illustrates schematic diagrams of a fluorescent lamp in a running conduction mode H and operation of the LED lamp circuit shown in FIG. 2 that "mimics" this fluorescent lamp operation, according to the teachings of this disclosure.
Figure 15:
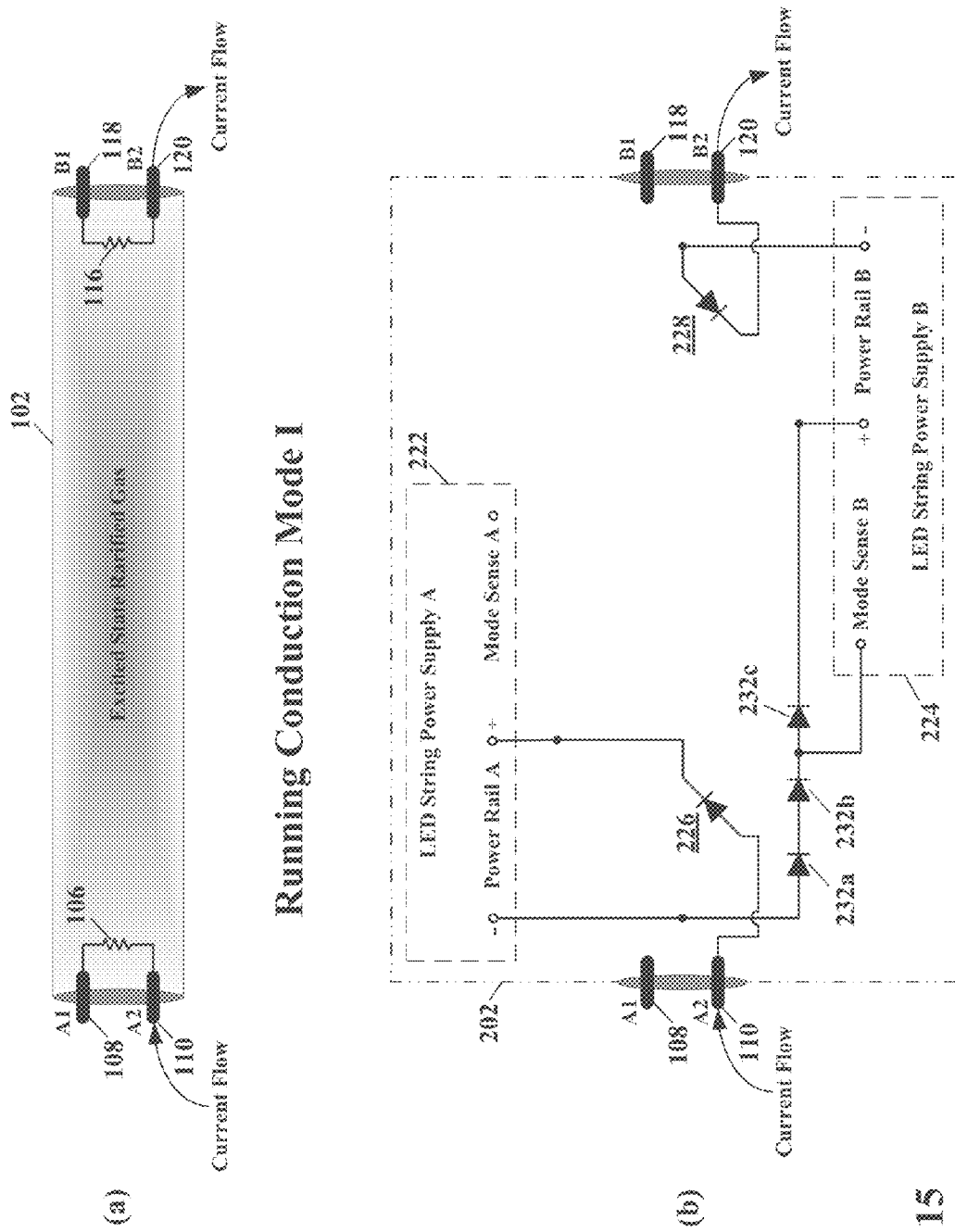
FIG. 15 illustrates schematic diagrams of a fluorescent lamp in a running conduction mode I and operation of the LED lamp circuit shown in FIG. 2 that "mimics" this fluorescent lamp operation, according to the teachings of this disclosure.
Figure 16:
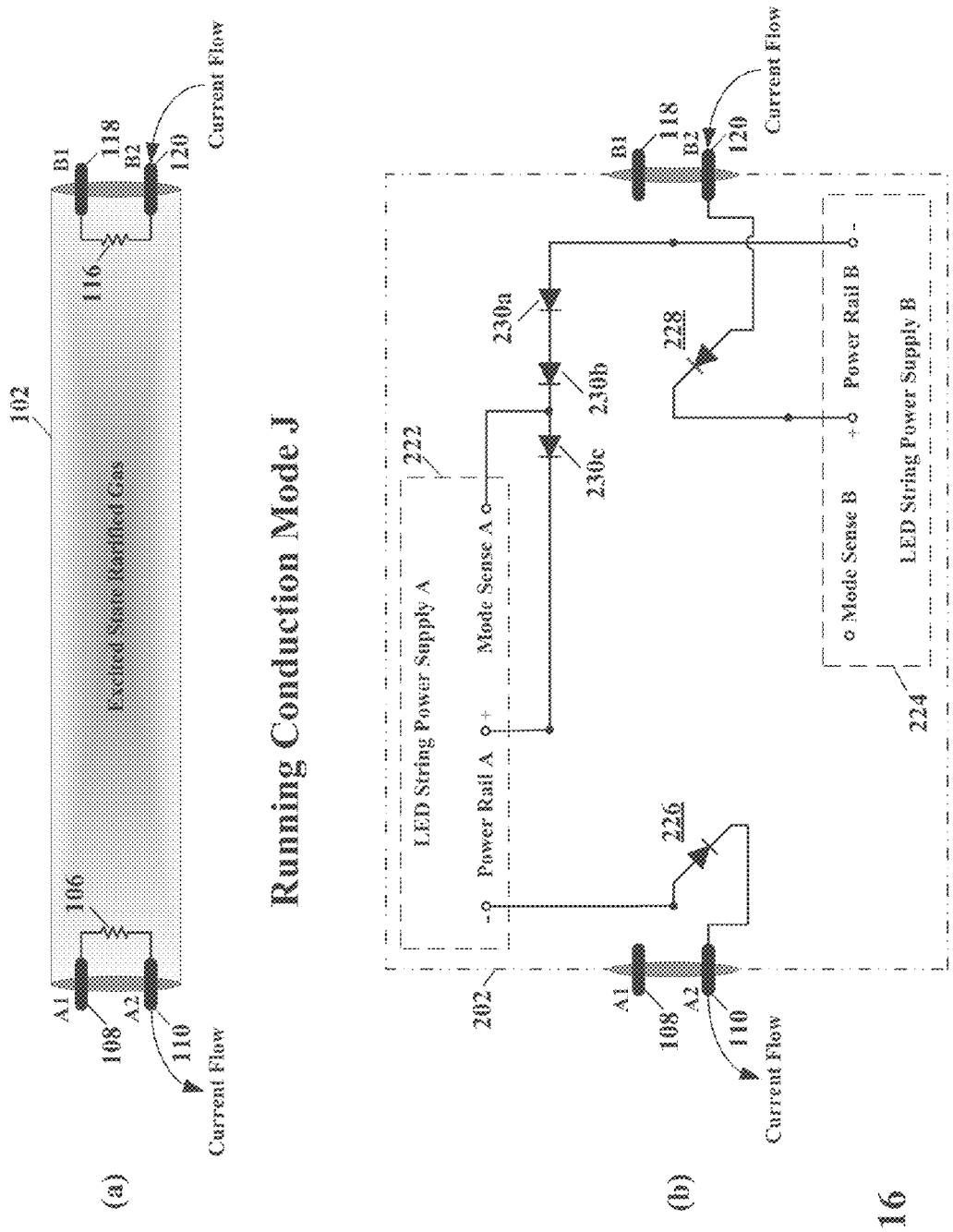
FIG. 16 illustrates schematic diagrams of a fluorescent lamp in a running conduction mode J and operation of the LED lamp circuit shown in FIG. 2 that "mimics" this fluorescent lamp operation, according to the teachings of this disclosure.
Figure 17:
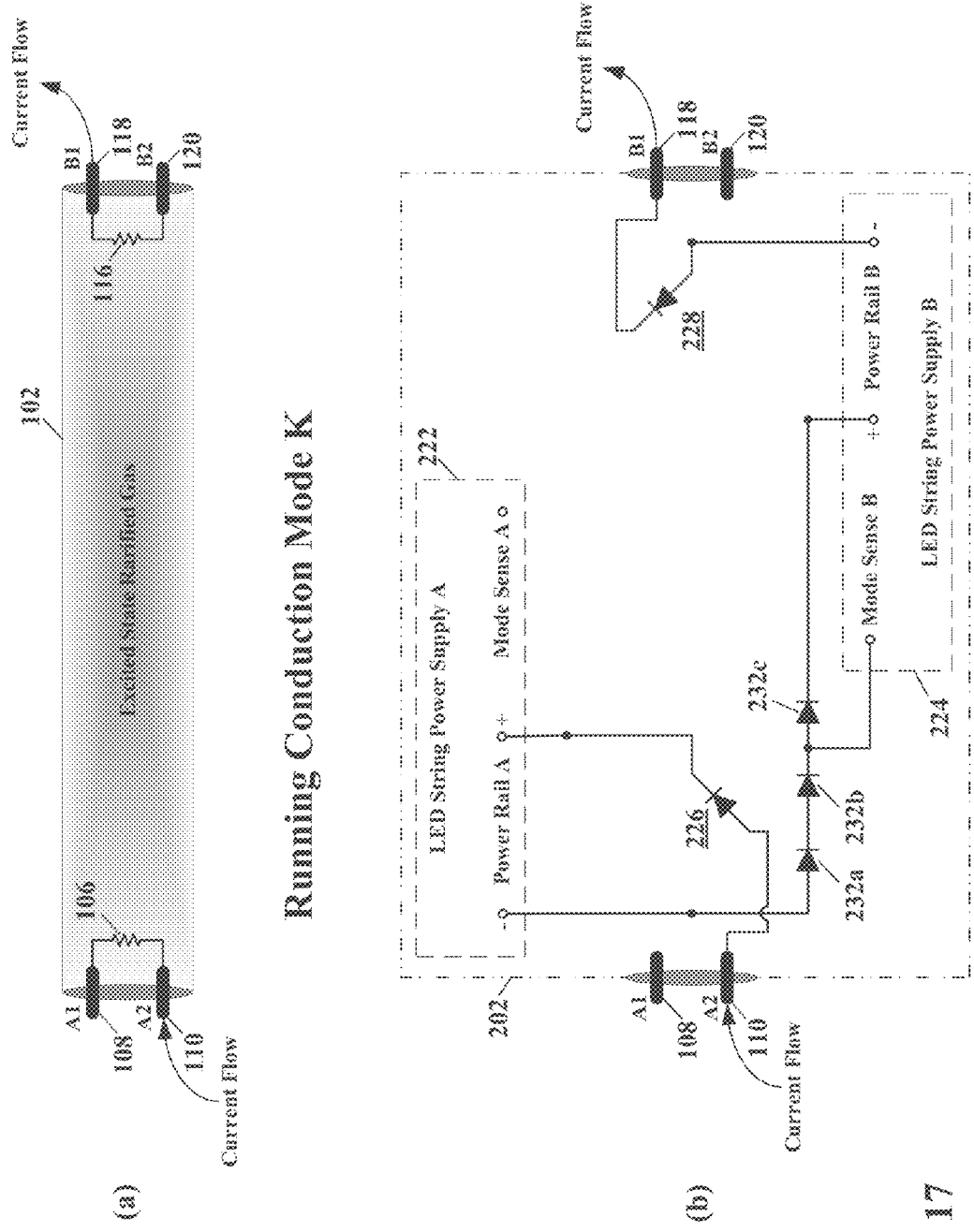
FIG. 17 illustrates schematic diagrams of a fluorescent lamp in a running conduction mode K and operation of the LED lamp circuit shown in FIG. 2 that "mimics" this fluorescent lamp operation, according to the teachings of this disclosure.
Figure 20:
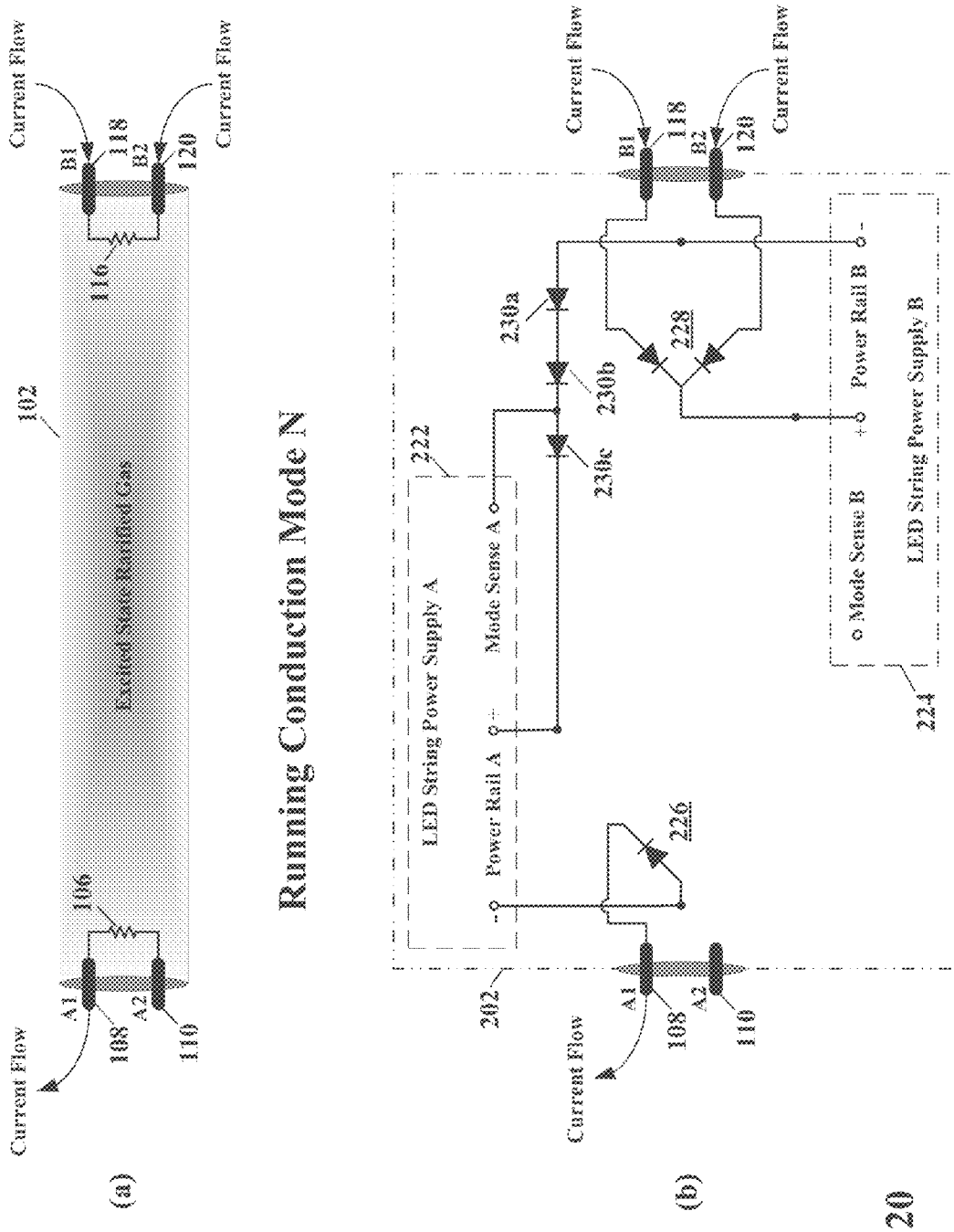
FIG. 20 illustrates schematic diagrams of a fluorescent lamp in a running conduction mode N and operation of the LED lamp circuit shown in FIG. 2 that "mimics" this fluorescent lamp operation, according to the teachings of this disclosure.
Figure 21:
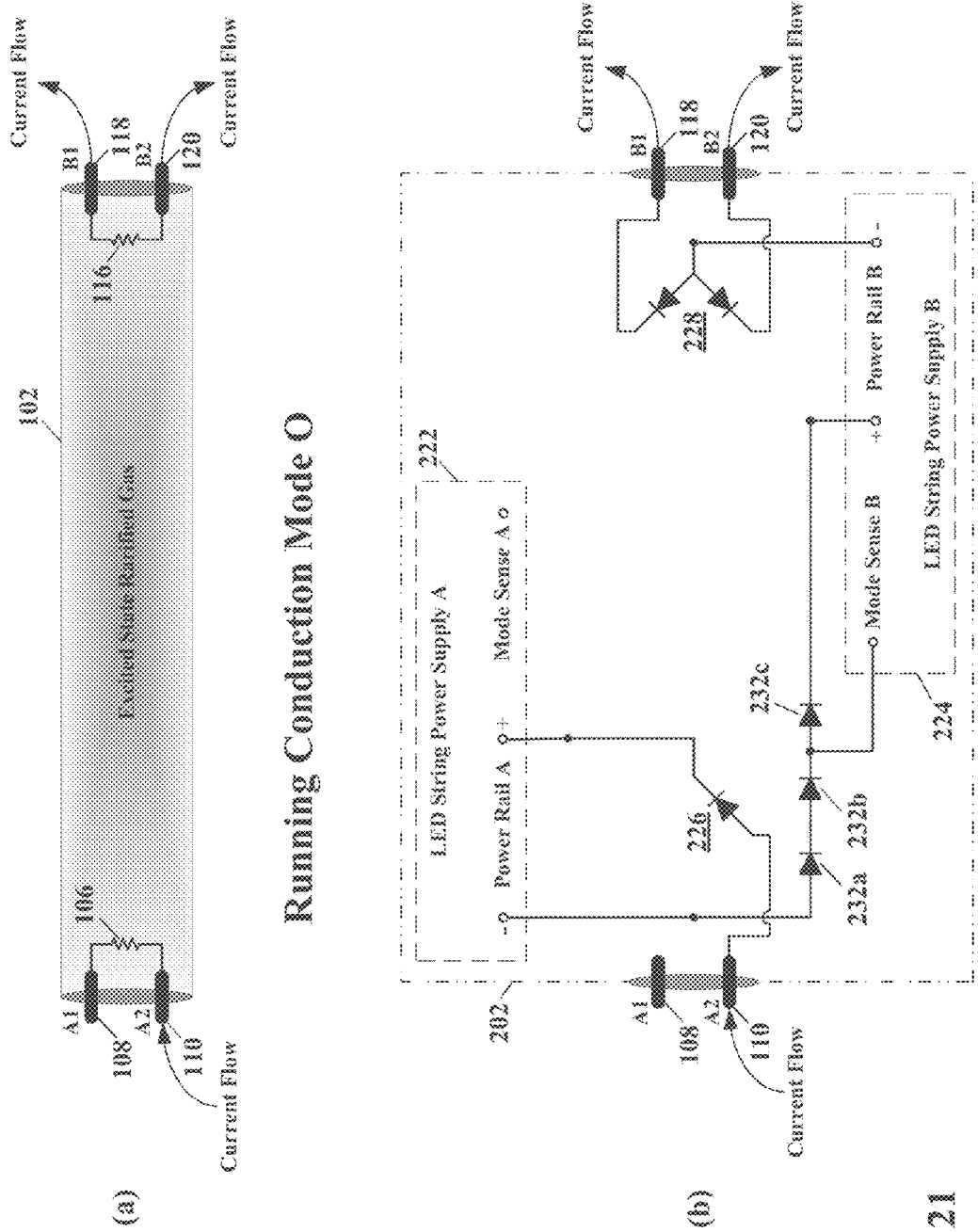
FIG. 21 illustrates schematic diagrams of a fluorescent lamp in a running conduction mode O and operation of the LED lamp circuit shown in FIG. 2 that "mimics" this fluorescent lamp operation, according to the teachings of this disclosure.
Figure 22:
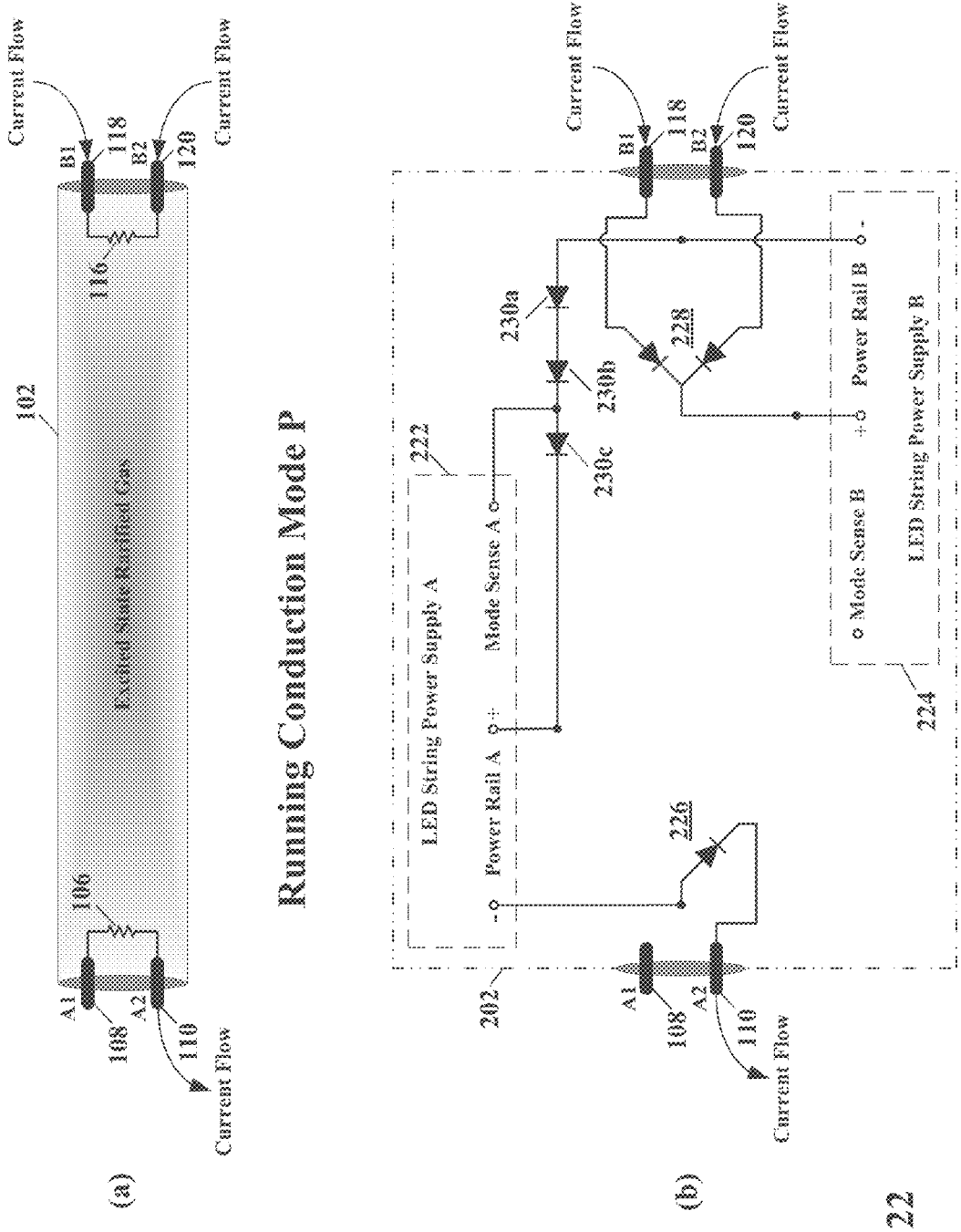
FIG. 22 illustrates schematic diagrams of a fluorescent lamp in a running conduction mode P and operation of the LED lamp circuit shown in FIG. 2 that "mimics" this fluorescent lamp operation, according to the teachings of this disclosure.
Figure 25:
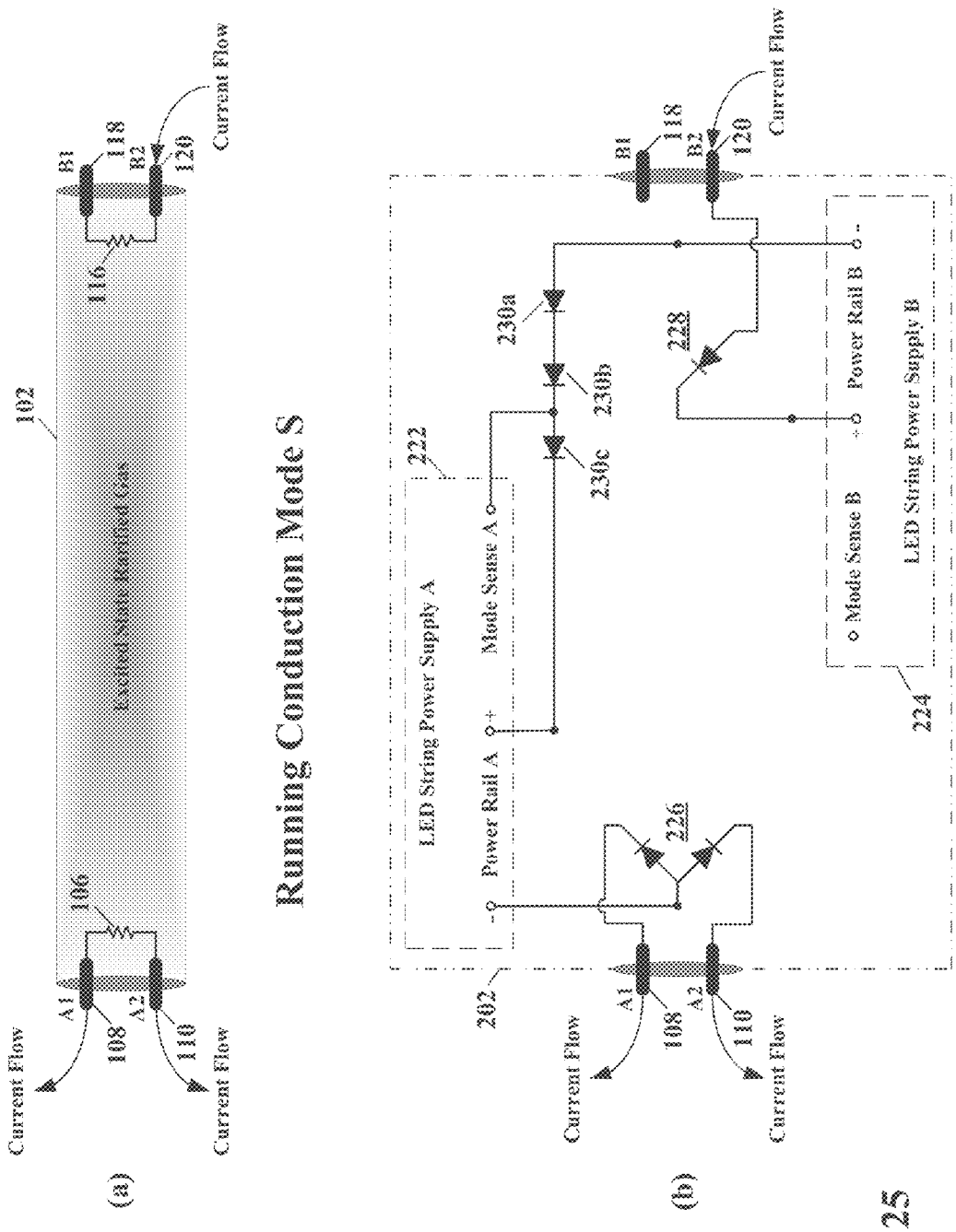
FIG. 25 illustrates schematic diagrams of a fluorescent lamp in a running conduction mode S and operation of the LED lamp circuit shown in FIG. 2 that "mimics" this fluorescent lamp operation, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

According to various embodiments of this disclosure, a light emitting diode (LED) lamp circuit is disclosed and claimed herein that can replace a fluorescent lamp in a fluorescent light fixture without having to modify the fluorescent fixture in any way. Existing LED replacement lamps require that the lamp ballast in a fluorescent light fixture be rewired in some way. Certain ballasts may be compatible with some of the presently offered LED lamps but not all ballasts are supported. According to various embodiments, a circuit for a LED lamp is disclosed that will work with all current infrastructure fluorescent ballasts and fixtures, and therefore no rewiring of the existing fluorescent lamp ballast circuitry is required. It is contemplated and within the scope of this disclosure that the LED lamp circuit may be provided in comparable physical lamp configurations (LED lamp structures) to the fluorescent lamps that they would replace. Fluorescent lamps come in many shapes and sizes, for example but is not limited to, bi-pin T-5, T-8, T-10, T-12, T-17 in two, four, and eight foot lengths; U-bend, etc., and the disclosed and claimed LED lamp circuit could match these when provided in appropriate LED lamp structures.

According to various embodiments, the LED light string and its associated drive circuitry may be divided into two symmetric light strings. Furthermore, the two strings (power rails more precisely) may be tied together with a diode voltage/current steering system. The LED fluorescent lamp replacement design 'spoofs' all lamp drive modes that a ballast could deliver.

This disclosure describes a technique for use on LED replacement lamps intended to be installed in existing hot cathode fluorescent lamp fixtures. Current 'State of the Art' LED replacement lamp designs require some electrical rework of existing, installed fluorescent lamp fixtures to operate correctly. While the rework is usually minor, it is a hazardous activity since high voltage is present. The work typically requires a qualified electrician. This disclosure discusses a diode current steering design to be used with LED power supply drivers for implementation of a replacement LED lamp that works with all currently installed fluorescent lamp fixture infrastructure. Because no rework of existing and installed fluorescent lamp fixtures is required to use the disclosed design, the hazardous and expensive requirements of previous techniques are avoided. This should lead to greater penetration of LED lamps into the fluorescent lamp replacement market.

Referring now to the drawings, the details of specific example embodiments are schematically illustrated. Like elements in the drawings will be represented by like numbers, and similar elements will be represented by like numbers with a different lower case letter suffix.

Referring to FIG. 2, depicted is a schematic diagram of a LED lamp circuit adapted for replacing a fluorescent lamp in a fluorescent fixture without having to modify the fluorescent fixture, according to specific example embodiments of this disclosure. An LED lamp 202 may comprise a first LED string and power supply 222, a second LED string and power supply 224, steering diodes 226, 228, 230 and 232, and first bi-pin connections 108 and 110 on one end of the LED lamp 202, and second bi-pin connections 118 and 120 on the other end of the LED lamp 202.

The key to understanding the operation of the current/voltage diode steering used in the LED circuit shown in FIG. 2 is that two independent power rails are provided. Using these two rails results in the ability of this LED lamp to work with all known ballast configurations. The voltages on these rails 'float' against each other and thereby can never be cross connected. Each power rail is capable of driving LED strings comprising a plurality of LED topologies. These topologies are well documented in the LED lighting arts. However, the loads present on these rails preferably should be fairly equal. When the loads are substantially equal, the resulting voltages on these rails will be substantially the same. While it is not required that these loads be equal (balanced) for proper operation of the diode steering, balanced loads make the design of the LED lamp very symmetric, and so easier to implement.

It is contemplated and within the scope of this disclosure that the steering diodes 226, 228, 230 and 232 may comprise any type of diode having sufficient current carrying capacitor and peak inverse voltage ratings for the intended application thereof. The steering diodes 226, 228, 230 and 232 may be, for example but are not limited to, silicon, Schottky, fast recovery, etc.

Conduction Modes

There are many ways that electrical current can flow through the filaments 106 and 116 and across the gas in a standard fluorescent lamp 102 that will yield proper lamp operation. As disclosed hereinafter, all the required conduction modes will be defined. Each conduction mode illustrated has a sub-schematic of the steering diodes shown in FIG. 2. These sub-schematics show the instantaneous DC current conduction through the appropriate steering diodes. Only those diodes that conduct for that current mode are shown. The other diodes that are not shown either have no potential across them or are reverse biased, thereby blocking current flow therethrough.

Referring to FIGS. 3 through 6, depicted are schematic diagrams of a fluorescent lamp in preheat conduction modes A, B, C and D, respectively, and the operation of the LED lamp circuit shown in FIG. 2 that "mimics" these fluorescent lamp preheat conduction operations, according to the teachings of this disclosure. Referring back to FIG. 1, the 'Preheat State' occurs when the preheat starter switch closes. This forces current across the filaments in a fluorescent lamp for the purpose of heating up these filaments. Because the preheat starter switch is closed during the preheat mode and the loads on the power rails are identical, the voltages generated on each power rail during any given preheat mode are one half of the total RMS line voltage (less the diode forward voltage drops). That is:

$$V_{RMSPowerSupplyA} = V_{RMSPowerSupplyB} = \frac{1}{2}(\text{Mains\_Voltage}_{RMS} - 4V_{F\_Diode}) \quad \text{Equation 1}$$

Referring to FIGS. 7 through 26, depicted are schematic diagrams of fluorescent lamps in running conduction modes A through T, and steering diode operation of the LED lamp circuit shown in FIG. 2 that "mimics" the operation of the fluorescent lamps in these running conduction modes, according to the teachings of this disclosure. Referring back again to FIG. 1, the 'Running State' occurs when the preheat starter switch opens after the 'Preheat State' is over. In a fluorescent lamp this causes a 'strike' to occur in the gas. There is no strike when the steering diodes are used with LEDs in the same ballast fixture. The current in the inductor 112 continues to flow uninhibited when the state change occurs. No high voltages are ever generated.

Because fluorescent lighting fixtures can be wired in a number of different ways that make no difference to the proper operation of the bulb, all of the various DC conduction modes need to be considered and the present invention needs to support all these current conduction paths. Because the loads on the power rails are substantially the same, the voltages generated on each power rail during any given running mode are one half of the total RMS line voltage (less the diode forward voltage drops). That is:

$$V_{RMSPowerSupplyA} = V_{RMSPowersupplyB} = \frac{1}{2}(\text{Mains\_Voltage}_{RMS} - 5V_{F\_Diode}) \quad \text{Equation 2}$$

Note that Equation 2 is not identical to Equation 1. There is a one diode forward voltage drop difference between the two. That is, during the Preheat State the voltage on the rails will be somewhere between 0.3 and 0.7 volts higher than when the system advances to the Running State. It is very important that there be at least a one diode voltage drop difference between the operation of the Preheat State and the Running State. Many electronic ballasts will actively sense the current across the filaments in order to determine if a filament is 'burnt out'. If the higher diode drops were not there, the current would take a 'short cut' through the diodes coupling the A side from the B side without conducting through all four lamp pins. Electronic ballasts that monitor the current through the pins, may quit driving the lamp assuming it to be defective. The steering diodes shown in FIG. 2 are the least number of diodes required to 'spoof' an electronic ballast into sensing that a fluorescent lamp is in circuit (not an LED replacement) and that it is operating nominally.

Mode Sense Input Available for Power Rails

Note that each power supply rail has a Mode Sense pin associated with it. When the ballast puts the bulb in the Preheat State, this pin will just float relative to the power supply's negative rail. If the Mode Sense pin on each power supply rail is clamped via a pull-down resistor to its negative rail, the LED drive electronics powered by this rail can sense when the external ballast switches to the Running State. Every half AC cycle one of the two power rails will have an active, asserted voltage on its Mode Sense pin. The other rail will see its Mode Sense as clamped to low. During the next half AC cycle, the two power supply rails will see the opposite; that is, the latter will have its Mode sense active while the former will see it clamped to a low. In this way, within about one half the mains cycle period, it will be known to the LED drive electronics that the ballast has put the lamp into the Running State. Knowing which state that an electronic ballast is driving the fluorescent lamp can be quite useful. Many microcontroller based electronic ballast designs expect to measure differences in current flow between the Preheat and Running States. The LED drive electronics can adjust its drive current so as to mimic the current profile of a fluorescent lamp.

Figure 27:
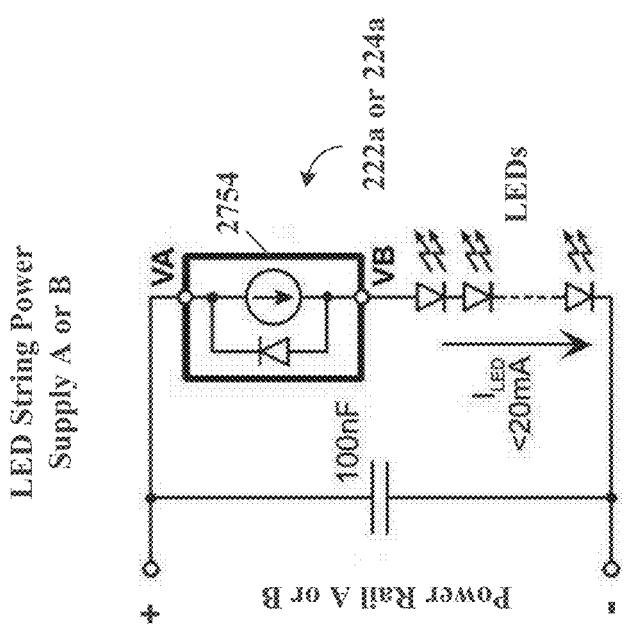
FIG. 27 illustrates a schematic diagram of a LED driver that may be used for the LED lamp circuits shown in FIG. 2.

Referring to FIG. 27, depicted is a schematic diagram of a LED driver that may be used for the LED lamp circuits shown in FIG. 2. A simple current source 2754 may be used such as, for example but is not limited to, a Supertex CL2 LED driver. The requirements of the LED power supply can be quite modest as FIG. 27 illustrates. This design uses only two components (driver and capacitor) besides the LEDs themselves.

Figure 28:
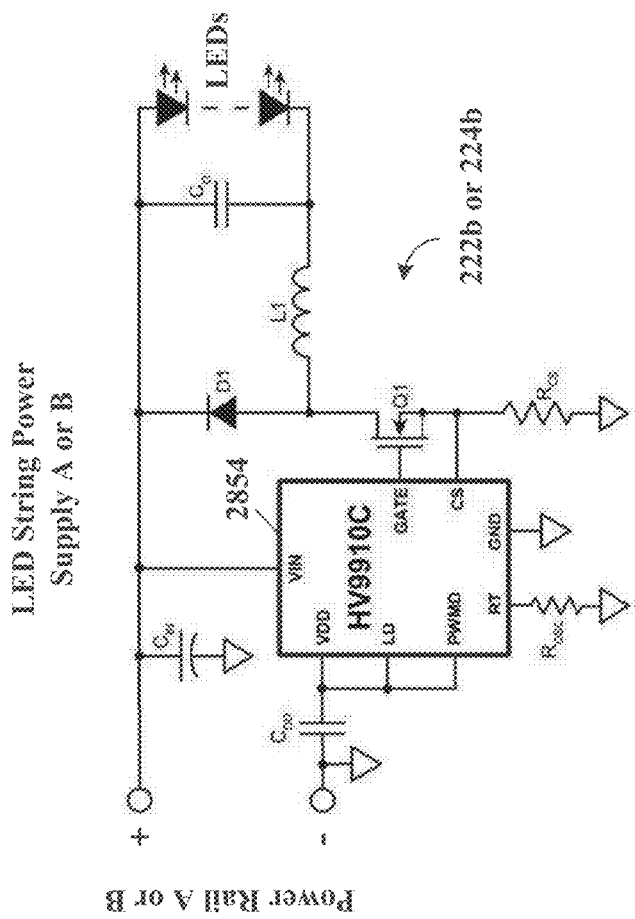
FIG. 28 illustrates a schematic diagram of a LED driver comprising buck switched mode power supply topology that may be used in the LED lamp circuit shown in FIG. 2.

Referring to FIG. 28, depicted is a schematic diagram of a LED driver comprising buck switched mode power supply topology that may be used in the LED lamp circuit shown in FIG. 2. A Universal High-Brightness LED Driver such as the Microchip HV9910C may be utilized in buck switched mode power supply configuration.

Figure 29:
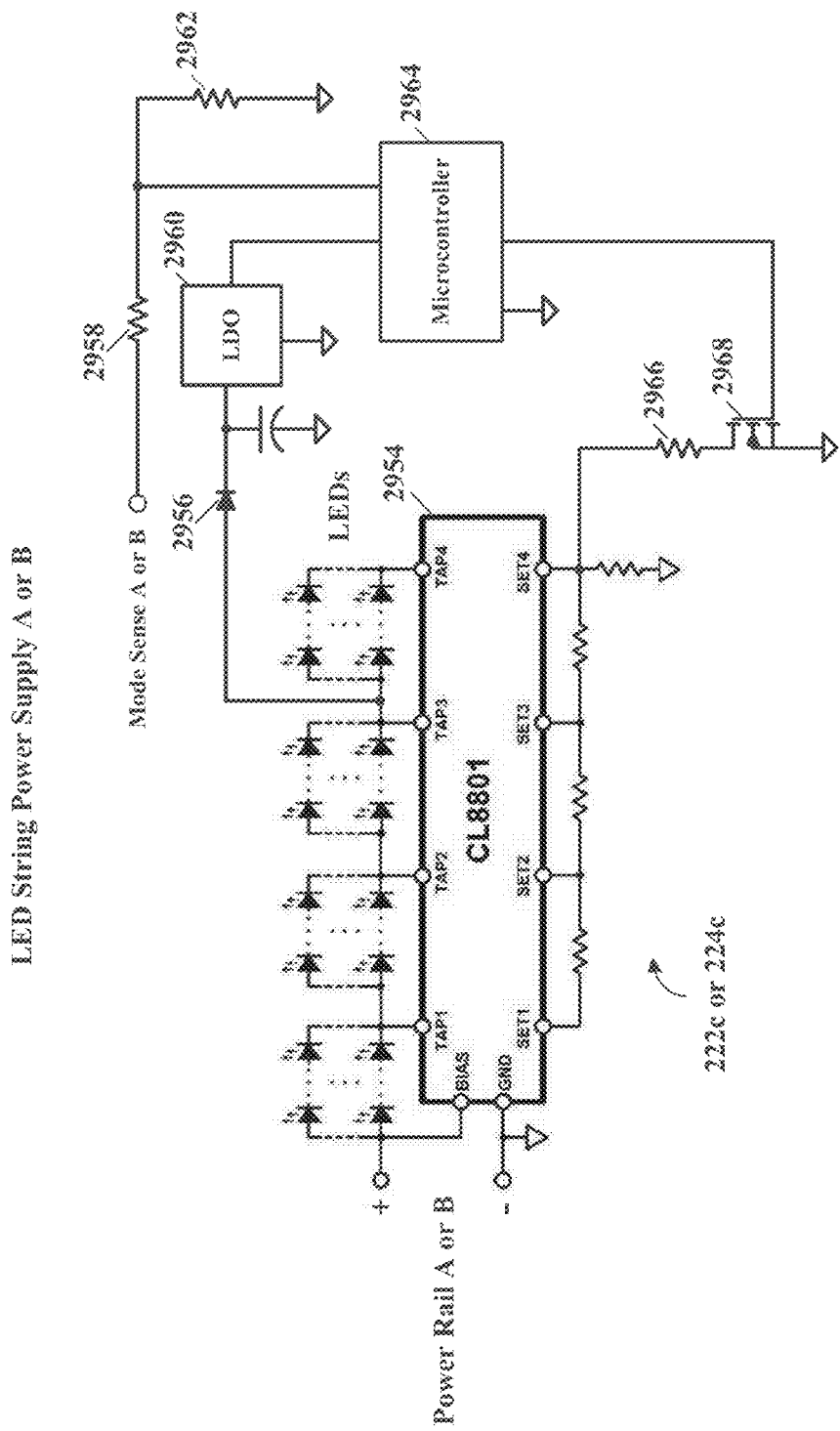
FIG. 29 illustrates a schematic diagram of a sequential linear LED driver that may be used in the LED lamp circuit shown in FIG. 2.

Referring to FIG. 29, depicted is a schematic diagram of a sequential linear LED driver that may be used in the LED lamp circuit shown in FIG. 2. FIG. 29 has an LED driver device 2954 specifically designed for fluorescent lamp replacement. Note that the driver circuit shown in FIG. 29 has no inductors or capacitors, which typically take up space on the circuit board. The driver shown in FIG. 29 may be, for example but is not limited to, a Supertex CL8801 or equivalent. The LED string power supply 222c or 224c may further comprise a rectifier diode 2956, a low drop out (LDO) voltage regulator 2960, e.g., MCP 1702; a microcontroller 2964, e.g., PIC12F1612; an N-channel MOSFET 2968, and resistors 2958, 2962, and 2966. The microcontroller 2964 can be coupled to the Mode Sense input used to determine if the ballast is in a Preheat or Running state, and then alter the current consumption of the LED string to 'spoof' smart microcontroller ballasts by turning on or off the N-MOSFET 2968 which connects or disconnects the resistor 2966 to or from the LED driver device 2954 which will change the value of its series current. If mode sensing is not required then the microcontroller 2964 and its associated circuit components are not necessary.

Figure 30:
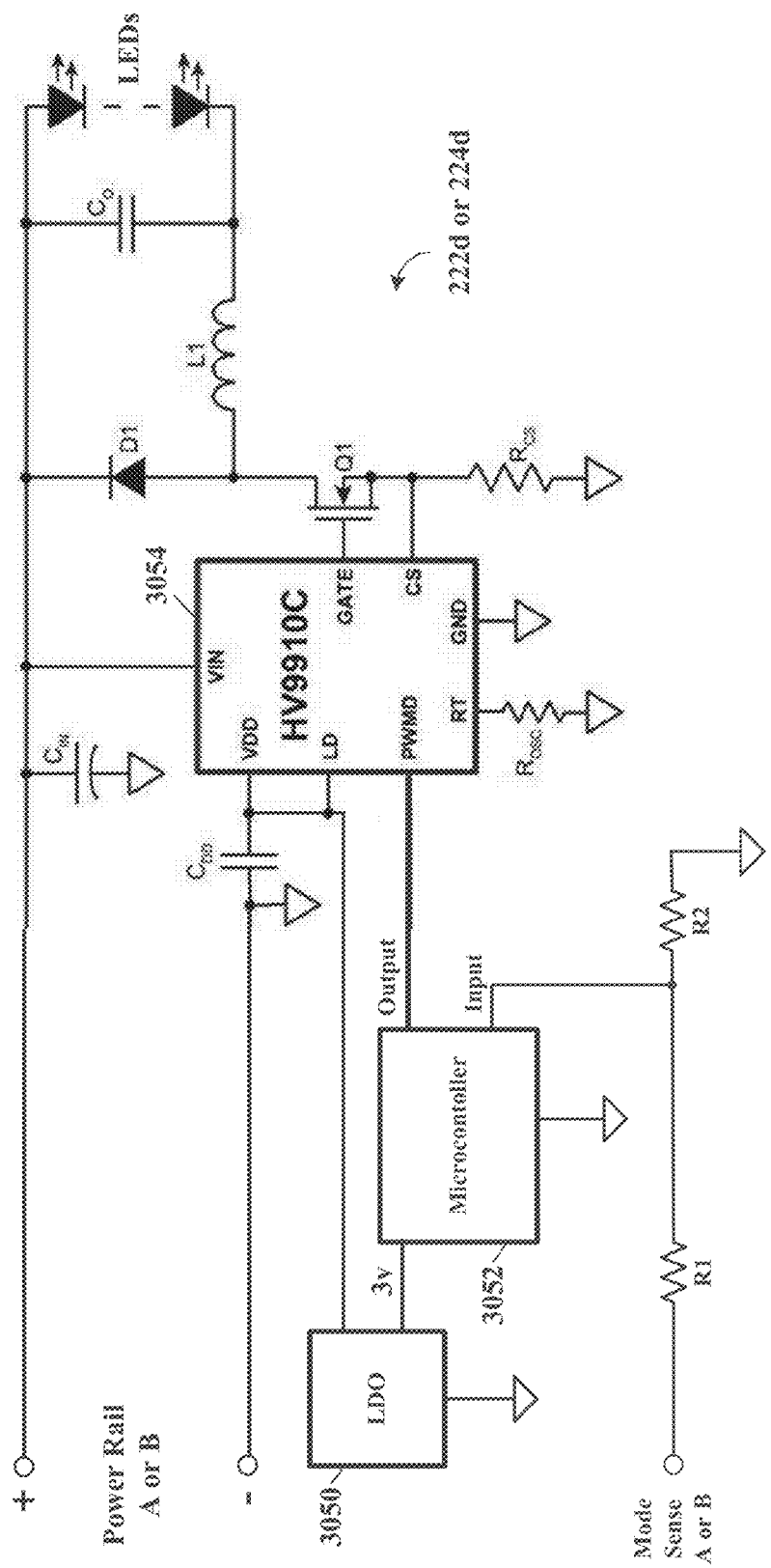
FIG. 30 illustrates a schematic diagram of a LED driver comprising buck switched mode power supply topology, a low drop out voltage regulator and a microcontroller that may be used in the LED lamp circuit shown in FIG. 2 and further comprises sense mode monitoring.

Referring to FIG. 30, depicted is a schematic diagram of a LED driver comprising buck switched mode power supply topology, a low drop out voltage regulator and a microcontroller that may be used in the LED lamp circuit shown in FIG. 2 and further comprises sense mode monitoring. The LED driver shown in FIG. 30 may comprise a microcontroller 3052 that uses the Mode Sense signals that are available to change current values in accordance with what a smart ballast expects to see in a properly operating fluorescent lamp. The driver device (e.g., HV9910C) 3054 maybe a buck mode power supply configuration that also allows for the dimming of the LED string, and thereby controls the overall current that the fixture ballast must supply. In this way, the state of the ballast is identified by the assertion of the Mode Sense signal and the microcontroller 3052 adjusts the LED current accordingly. As previously explained, many electronic ballasts expect to sense a current difference at different ballast states. The microcontroller 3052 can mimic the behavior of a fluorescent lamp in this manner and 'spoof' the electronic ballast that a fluorescent lamp is in circuit (not an LED replacement) and it is operating nominally. A low dropout (LDO) voltage regulator 3050 may also be provided for powering the microcontroller 3052.

Higher Efficiency Active Rectification

Equations 1 and 2 both have terms that are multiples of Vf, or the forward voltage drop of the diode rectifiers. While driving current across the lamp, a total voltage drop of five times Vf is seen. Even with low Vf diodes, since all the LED current passes through these five diodes and a portion of power is lost in these diode rectifiers, not converted to light but to heat. This may be mitigated by replacing the two bridge rectifier stages 226, 228 with MOSFETs as more fully described hereinafter.

Figure 31:
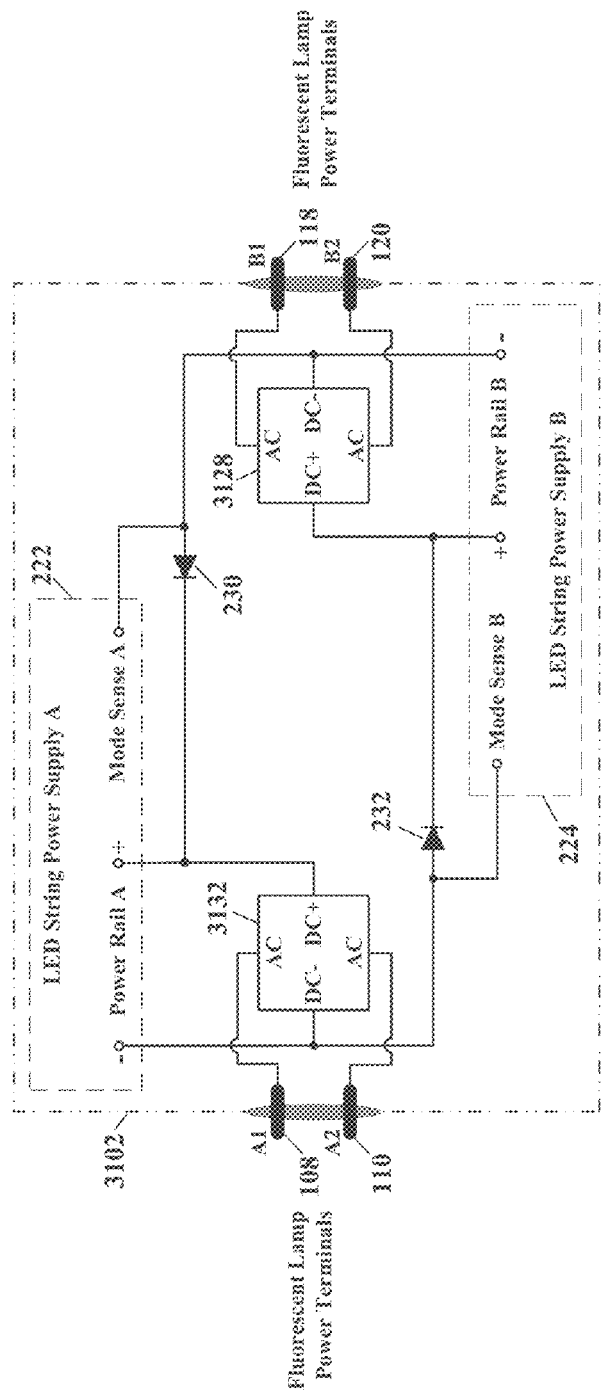
FIG. 31 illustrates a schematic diagram of a higher efficiency LED lamp circuit adapted for replacing a fluorescent lamp in a fluorescent fixture without having to modify the fluorescent fixture, according to other specific example embodiments of this disclosure.

Referring to FIG. 31, depicted is a schematic diagram of a higher efficiency LED lamp circuit adapted for replacing a fluorescent lamp in a fluorescent fixture without having to modify the fluorescent fixture, according to other specific example embodiments of this disclosure. An LED lamp 3102 may comprise a first LED string and power supply 222, a second LED string and power supply 224, steering diodes 230 and 232, MOSFET bridge rectifiers 3128 and 3132, and first bi-pin connections 108 and 110 on one end of the LED lamp 3102, and second bi-pin connections 118 and 120 on the other end of the LED lamp 3102. The LED lamp 3102 works in substantially the same way as the LED lamp 202, but has less power losses because the number of high voltage drop diodes have been reduced, thus improving efficiency of the LED lamp 3102 compared to the LED lamp 202.

The purpose of substituting MOSFETs for the diodes is to save on the power dissipated through these devices. When a MOSFET is on, the voltage drop across the source to drain is very small, insignificant to the forward drop inherent on diodes. So, the heat dissipated from these devices is inherently less than the dissipation through the diodes, thus increasing the efficiency of the rectification function. Using MOSFET bridge rectifiers are well known in the semiconductor design arts.

Figure 33:
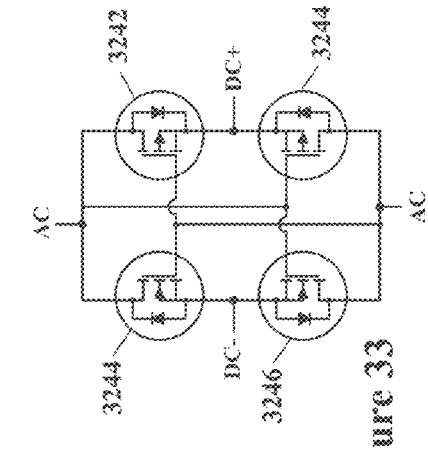
FIG. 33 illustrates a schematic a schematic diagram of a simplified MOSFET implemented bridge rectifier as used in FIG. 31 and having lower power losses than diodes.
Figure 32:
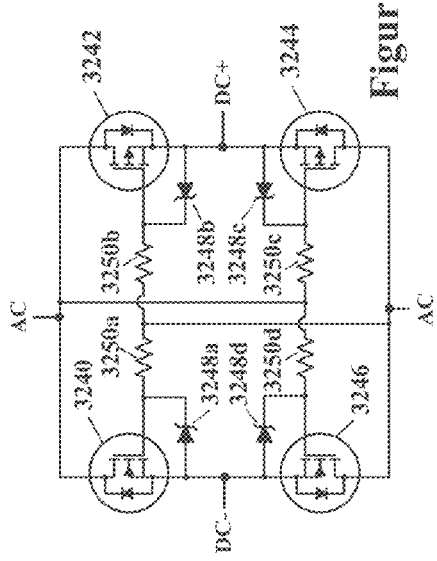
FIG. 32 illustrates a schematic diagram of a MOSFET implemented bridge rectifier as used in FIG. 31 and having lower power losses than diodes.

Referring to FIGS. 32 and 33, depicted are schematic diagrams of a MOSFET implemented bridge rectifier as used in FIG. 31 and having lower power losses than diodes. The MOSFET bridge rectifiers shown in FIGS. 32 and 33 comprise N-channel MOSFETs 3240 and 3246, and P-Channel MOSFETs 3242 and 3244. The MOSFET bridge rectifier shown in FIG. 32 further comprises Zener diodes 3248 and current limiting resistors 3250 on each gate of the MOSFETs 3242 and 3244, while FIG. 33 does not. This is the only difference between the two circuits shown in FIGS. 32 and 33.

Each of the MOSFETs 3240, 3242, 3244 and 3246 shown in FIGS. 32 and 33 functions as a valve exactly as the diodes in shown in FIG. 2. That is, they pass current in a particular direction and block current flow in the opposite direction. The substrate diode in each MOSFET exactly indicates the direction of current flow where the MOSFET is biased to conduct. These substrate diodes will conduct when the AC RMS voltage is less than the sum of the N-channel and P-channel turn-on threshold voltages. But, once the AC RMS voltage is above this summed threshold, the MOSFETs will switch on, thus reducing the voltage drop across them. Note that the MOSFETs will switch on in pairs, providing a rectifying function.

Note that in both FIG. 31 there still are two diodes 230 and 232 required. As stated previously, it is important that there be one diode drop voltage difference between the operation of the Preheat State and the Running State. As stated previously, this is needed to 'spoof' many ballast designs that try to determine if fluorescent lamp filaments are burnt out. When the lamp is driven so that current is run across the filaments and not across the lamp, these diodes 230 and 232 won't conduct as there will be a lower voltage drop across two of the ON MOSFETs assuring that current is present as if filaments were conducting. These diodes 230 and 232 will only conduct when in the Running State. Note that the operation of the Mode Sense inputs on the LED string Power supplies are exactly the same in operation but with MOSFETs instead of with diodes.

FIG. 33 is a simpler version of FIG. 32 but may not be suitable for all designs. In FIG. 32, the Zener diodes 3248 and current limiting resistors 3250 perform a function for the MOSFETs 3240, 3242, 3244 and 3246. These Zener diodes 'clamp' the maximum voltage seen across the gate to source of the MOSFETs. This voltage can be quite high in this implementation. Certain combination of MOSFETs and LED String Power Supply designs may not produce a Vgs that is out of specification with the MOSFET chosen. In that case FIG. 33 is an implementation with fewer parts.

Another consideration when using active rectification for this technique is whether or not the LED String Power Supply has an input capacitor. This active rectification method will not work if so. To use active rectification, the chosen LED String Power Supply must be free of input capacitors such as the circuit shown in FIG. 29, or equivalent. Note that this LED String Power Supply example has no input capacitor that will 'back drain' though the MOSFET active rectifiers. It also has the ability to sense if the ballast is in Preheat or Running states, and alter its current consumption to 'spoof' smart microcontroller ballasts.

The LED drive circuits shown in FIGS. 27-31 are only a few examples of possible LED driver/power supplies. Any properly designed LED power supply that can deliver the required LED current and work with the restrictions implied by Equations 1 and 2 will work as long as continuous current flows into the supplies from the fixture's ballast's perspective. Discontinuous operation may confuse many electronic ballasts into sensing that the fluorescent lamp is either extinguished or burnt out and inoperable.

As a final note to FIGS. 28-31 (and actually to all LED power supply driver topologies used in the art): These schematics show a ground or equi-potential symbol (triangle pointing downwards). There needs to be two sets of power supply rails and two power supply circuits for this invention to work correctly. The equi-potentials of Power Rails A and B are NEVER to be tied together. That is, the equi-potentials are local to each supply ONLY, and interconnected on that supply ONLY.

The invention claimed is:

1. A light emitting diode (LED) apparatus for replacing a fluorescent lamp, comprising:
    a LED lamp structure having first, second, third and fourth electrical contacts configured to match size and locations of respective electrical contacts of a fluorescent lamp;
    a first LED light string and first power supply located in the LED lamp structure, the first power supply having plus and minus power inputs;
    a second LED light string and second power supply located in the LED lamp structure, the second power supply having plus and minus power inputs;
    a first plurality of diodes arranged in a bridge rectifier configuration and having first, second, third and fourth nodes, wherein the first node is coupled to the minus power input of the first power supply, the second node is coupled to the first electrical contact, the third node is coupled to the plus power input of the first power supply, and the fourth node is coupled to the second electrical contact;
    a second plurality of diodes arranged in a bridge rectifier configuration and having first, second, third and fourth nodes, wherein the first node is coupled to the minus power input of the second power supply, the second node is coupled to the third electrical contact, the third node is coupled to the plus power input of the second power supply, and the fourth node is coupled to the fourth electrical contact;
    a third plurality of diodes arranged in a series coupled string, wherein an anode of the series coupled string of the third plurality of diodes is coupled to the minus power input of the first power supply and the first node of the first plurality of diodes, and a cathode of the series coupled string of the third plurality of diodes is coupled to the plus power input of the second power supply and the third node of the second plurality of diodes; and
    a fourth plurality of diodes arranged in a series coupled string, wherein an anode of the series coupled string of the fourth plurality of diodes is coupled to the minus power input of the second power supply and the first node of the second plurality of diodes, and a cathode of the series coupled string of the fourth plurality of diodes is coupled to the plus power input of the first power supply and the third node of the first plurality of diodes.

2. The LED apparatus according to claim 1, further comprising:
    a first mode sense input associated with the first power supply and coupled to an anode of the diode having its cathode coupled to the plus power input of the first power supply; and
    a second mode sense input associated with the second power supply and coupled to an anode of the diode having its cathode coupled to the plus power input of the second power supply.

3. The LED apparatus according to claim 1, wherein each of the first and second LED light strings comprises a plurality of LEDs.

4. The LED apparatus according to claim 1, wherein the first and second power supplies each comprise a constant current source.

5. The LED apparatus according to claim 1, wherein the first and second power supplies each comprise a sequential linear LED driver.

6. The LED apparatus according to claim 1, wherein the first and second power supplies each comprise a buck switched mode power supply.

7. The LED apparatus according to claim 2, further comprising:
    a first microcontroller having an input coupled to the first mode sense input of the first power supply;
    a first LED driver controlled by the first microcontroller;

a second microcontroller having an input coupled to the second mode sense input of the second power supply; and a second LED driver controlled by the second microcontroller;

wherein the first and second LED drivers adjust current through the first and second LED light strings, respectively, based upon signal voltages at the first and second mode sense inputs.

8. The LED apparatus according to claim 1, wherein the LED lamp structure is selected from the group consisting of bi-pin T-5, T-8, T-10, T-12, and T-17 equivalent lamp sizes.

9. The LED apparatus according to claim 1, wherein the LED lamp structure is selected from the group consisting of two, four, and eight foot lengths.

10. The LED apparatus according to claim 1, wherein the LED lamp structure comprises a bi-pin U-bend tube.

11. The LED apparatus according to claim 1, wherein the first, second, third and fourth plurality of diodes are selected from the group consisting of silicon, Schottky and fast recovery diodes.

12. A light emitting diode (LED) apparatus for replacing a fluorescent lamp, comprising:

a LED lamp structure having first, second, third and fourth electrical contacts configured to match size and locations of respective electrical contacts of a fluorescent lamp;

a first LED light string and first power supply located in the LED lamp structure, the first power supply having plus and minus power inputs;

a second LED light string and second power supply located in the LED lamp structure, the second power supply having plus and minus power inputs;

a first plurality of metal oxide field effect transistors (MOSFETs) arranged in a bridge rectifier configuration and having first, second, third and fourth nodes, wherein the first node is coupled to the minus power input of the first power supply, the second node is coupled to the first electrical contact, the third node is coupled to the plus power input of the first power supply, and the fourth node is coupled to the second electrical contact;

a second plurality of MOSFETs arranged in a bridge rectifier configuration and having first, second, third and fourth nodes, wherein the first node is coupled to the minus power input of the second power supply, the second node is coupled to the third electrical contact, the third node is coupled to the plus power input of the second power supply, and the fourth node is coupled to the fourth electrical contact;

a first diode, wherein an anode of the first of diode is coupled to the minus power input of the first power supply and the first node of the first plurality of MOSFETs, and a cathode of the first diode is coupled to the plus power input of the second power supply and the third node of the second plurality of MOSFETs; and a second diode, wherein an anode of the second diode is coupled to the minus power input of the second power supply and the first node of the second plurality of MOSFETs, and a cathode of the second diode is coupled to the plus power input of the first power supply and the third node of the first plurality of MOSFETs.

13. The LED apparatus according to claim 12, further comprising:

a first mode sense input associated with the first power supply and coupled to the anode of the second diode having its cathode coupled to the plus power input of the first power supply; and a second mode sense input associated with the second power supply and coupled to an anode of the first diode having its cathode coupled to the plus power input of the second power supply.

14. The LED apparatus according to claim 13, further comprising:

a first microcontroller having an input coupled to the first mode sense input of the first power supply;

a first LED driver controlled by the first microcontroller;

a second microcontroller having an input coupled to the second mode sense input of the second power supply; and a second LED driver controlled by the second microcontroller;

wherein the first and second LED drivers adjust current through the first and second LED light strings, respectively, based upon signal voltages at the first and second mode sense inputs.

15. The LED apparatus according to claim 12, wherein the first and second power supplies each comprise a sequential linear LED driver.

16. A method for replacing a fluorescent lamp with a light emitting diode (LED) lamp, said method comprising the steps of:

providing a LED lamp structure having first, second, third and fourth electrical contacts configured to match size and locations of respective electrical contacts of a fluorescent lamp;

providing a first LED light string and first power supply located in the LED lamp structure, the first power supply having plus and minus power inputs;

providing a second LED light string and second power supply located in the LED lamp structure, the second power supply having plus and minus power inputs;

providing a first plurality of diodes arranged in a bridge rectifier configuration and having first, second, third and fourth nodes, wherein the first node is coupled to the minus power input of the first power supply, the second node is coupled to the first electrical contact, the third node is coupled to the plus power input of the first power supply, and the fourth node is coupled to the second electrical contact;

providing a second plurality of diodes arranged in a bridge rectifier configuration and having first, second, third and fourth nodes, wherein the first node is coupled to the minus power input of the second power supply, the second node is coupled to the third electrical contact, the third node is coupled to the plus power input of the second power supply, and the fourth node is coupled to the fourth electrical contact;

providing a third plurality of diodes arranged in a series coupled string, wherein an anode of the series coupled string of the third plurality of diodes is coupled to the minus power input of the first power supply and the first node of the first plurality of diodes, and a cathode of the series coupled string of the third plurality of diodes is coupled to the plus power input of the second power supply and the third node of the second plurality of diodes; and providing a fourth plurality of diodes arranged in a series coupled string, wherein an anode of the series coupled string of the fourth plurality of diodes is coupled to the minus power input of the second power supply and the first node of the second plurality of diodes, and a cathode of the series coupled string of the fourth plurality of diodes is coupled to the plus power input of the first power supply and the third node of the first plurality of diodes.

17. The method according to claim 16, further comprising the step of installing the LED lamp structure into a fluorescent lamp fixture.

18. A method for replacing a fluorescent lamp with a light emitting diode (LED) lamp, said method comprising the steps of:
- providing a LED lamp structure having first, second, third and fourth electrical contacts configured to match size and locations of respective electrical contacts of a fluorescent lamp;
- providing a first LED light string and first power supply located in the LED lamp structure, the first power supply having plus and minus power inputs;
- providing a second LED light string and second power supply located in the LED lamp structure, the second power supply having plus and minus power inputs;
- providing a first plurality of metal oxide field effect transistors (MOSFETs) arranged in a bridge rectifier configuration and having first, second, third and fourth nodes, wherein the first node is coupled to the minus power input of the first power supply, the second node is coupled to the first electrical contact, the third node is coupled to the plus power input of the first power supply, and the fourth node is coupled to the second electrical contact;
- providing a second plurality of MOSFETs arranged in a bridge rectifier configuration and having first, second, third and fourth nodes, wherein the first node is coupled to the minus power input of the second power supply, the second node is coupled to the third electrical contact, the third node is coupled to the plus power input of the second power supply, and the fourth node is coupled to the fourth electrical contact;
- providing a first diode, wherein an anode of the first diode is coupled to the minus power input of the first power supply and the first node of the first plurality of MOSFETs, and a cathode of the first diode is coupled to the plus power input of the second power supply and the third node of the second plurality of MOSFETs; and
- providing a second diode, wherein an anode of the second diode is coupled to the minus power input of the second power supply and the first node of the second plurality of MOSFETs, and a cathode of the second diode is coupled to the plus power input of the first power supply and the third node of the first plurality of MOSFETs.

* * * * *